US012215605B2

(12) United States Patent
Matsuo et al.

(10) Patent No.: US 12,215,605 B2
(45) Date of Patent: Feb. 4, 2025

(54) STATOR BLADE AND GAS TURBINE COMPRISING SAME

(71) Applicant: MITSUBISHI HEAVY INDUSTRIES, LTD., Tokyo (JP)

(72) Inventors: Saki Matsuo, Tokyo (JP); Satoshi Hada, Tokyo (JP); Yasuo Miyahisa, Tokyo (JP); Satoshi Mizukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/275,853

(22) PCT Filed: Mar. 17, 2022

(86) PCT No.: PCT/JP2022/012452
§ 371 (c)(1),
(2) Date: Aug. 4, 2023

(87) PCT Pub. No.: WO2022/202636
PCT Pub. Date: Sep. 20, 2022

(65) Prior Publication Data

US 2024/0117746 A1 Apr. 11, 2024

(30) Foreign Application Priority Data

Mar. 26, 2021 (JP) ................................ 2021-053113

(51) Int. Cl.
*F01D 9/04* (2006.01)
*F01D 5/18* (2006.01)
(Continued)

(52) U.S. Cl.
CPC ............... *F01D 9/041* (2013.01); *F01D 5/18* (2013.01); *F01D 9/02* (2013.01); *F01D 25/24* (2013.01);
(Continued)

(58) Field of Classification Search
CPC ... F01D 9/041; F01D 5/18; F01D 9/02; F01D 25/24; F05D 2240/12; F05D 2260/201
See application file for complete search history.

(56) References Cited

U.S. PATENT DOCUMENTS 5,120,192 A * 6/1992 Ohtomo .................. F01D 5/189 415/115
6,089,822 A * 7/2000 Fukuno .................. F01D 9/065 415/176
(Continued)

FOREIGN PATENT DOCUMENTS

JP 4885275 2/2012
JP 2013-19348 1/2013
(Continued)

OTHER PUBLICATIONS

International Search Report issued May 31, 2022 in International Application No. PCT/JP2022/012452 with English translation.
(Continued)

*Primary Examiner* — Topaz L. Elliott
*Assistant Examiner* — Andrew J Marien
(74) *Attorney, Agent, or Firm* — Wenderoth, Lind & Ponack, L.L.P.

(57) ABSTRACT

A stator blade including a blade body, a first insert, a second insert, and an end cover. The blade body has a first blade air passage and a second blade air passage extending in the blade height direction within the blade body. Each passage has an open end on a blade-height second side. The first insert and the second insert have tubular outer peripheral plate portions. A plurality of impinge holes are formed in the outer peripheral plate portion. The tube height opening side of the outer peripheral plate portion in the tube height direction is open. The outer peripheral plate portion of the first insert is disposed in the first blade air passage such that cooling air flows into the outer peripheral plate portion from
(Continued)

the opening of the first insert. The outer peripheral plate portion of the second insert is disposed in the second wing air passage.

10 Claims, 11 Drawing Sheets

(51) Int. Cl.
*F01D 9/02* (2006.01)
*F01D 25/24* (2006.01)

(52) U.S. Cl.
CPC .... *F05D 2240/12* (2013.01); *F05D 2260/201* (2013.01)

(56) References Cited

U.S. PATENT DOCUMENTS

| | | | | |
|---|---|---|---|---|
| 7,497,655 | B1 * | 3/2009 | Liang | F01D 5/189 415/115 |
| 7,871,246 | B2 | 1/2011 | Liang | |
| 8,016,553 | B1 * | 9/2011 | Liang | F01D 11/025 415/115 |
| 10,012,093 | B2 * | 7/2018 | Mugglestone | F01D 5/186 |
| 10,612,397 | B2 * | 4/2020 | Matsuo | F01D 9/02 |
| 2004/0018082 | A1 * | 1/2004 | Soechting | F01D 9/041 415/115 |
| 2010/0150734 | A1 | 6/2010 | Hada et al. | |
| 2011/0123351 | A1 * | 5/2011 | Hada | F01D 9/065 416/97 R |
| 2013/0309079 | A1 * | 11/2013 | Allen | F01D 9/041 415/208.1 |
| 2016/0194978 | A1 * | 7/2016 | Memmen | F01D 25/12 415/115 |
| 2018/0238176 | A1 * | 8/2018 | Landrum | F01D 5/188 |
| 2018/0328187 | A1 * | 11/2018 | Oke | F01D 9/065 |
| 2020/0190989 | A1 * | 6/2020 | Fujii | F01D 5/189 |
| 2022/0186623 | A1 | 6/2022 | Koyabu et al. | |

FOREIGN PATENT DOCUMENTS

| | | |
|---|---|---|
| JP | 6190874 | 8/2017 |
| JP | 2020-97907 | 6/2020 |
| WO | 2010/131385 | 11/2010 |
| WO | 2019/035178 | 2/2019 |

OTHER PUBLICATIONS

Written Opinion of the International Searching Authority issued May 31, 2022 in International Application No. PCT/JP2022/012452 with English translation.

* cited by examiner

STATOR BLADE AND GAS TURBINE COMPRISING SAME

TECHNICAL FIELD

The present invention relates to a stator vane and a gas turbine including the same.

Priority is claimed on Japanese Patent Application No. 2021-053113, filed on Mar. 26, 2021, the content of which is incorporated herein by reference.

BACKGROUND ART

A gas turbine includes a compressor that compresses air to generate compressed air, a combustor that combusts a fuel in the compressed air to generate a fuel gas, and a turbine driven by the combustion gas. The turbine includes a turbine rotor that rotates around an axis, a turbine casing that covers the rotor, and a plurality of stator vane rows. The turbine rotor includes a rotor shaft around the axis, and a plurality of rotor blade rows attached to the rotor shaft. The plurality of rotor blade rows are aligned in an axial direction where the axis extends. Each of the rotor blade rows includes a plurality of rotor blades aligned in a circumferential direction with respect to the axis. The plurality of stator vane rows are aligned in the axial direction, and are attached to an inner peripheral side of the turbine casing. Each of the plurality of stator vane rows is disposed on an axial upstream side of any one rotor blade row of the plurality of rotor blade rows. Each of the stator vane rows includes a plurality of stator vanes aligned in the circumferential direction with respect to the axis.

The stator vane includes a blade body that forms a blade shape by extending in a radial direction with respect to the axis, an inner shroud provided on a radial inner side of the blade body, and an outer shroud provided on a radial outer side of the blade body. The blade body of the stator vane is disposed inside a combustion gas passage through which the combustion gas passes. The inner shroud defines a radial inner side edge of the combustion gas passage. The outer shroud defines a radial outer side edge of the combustion gas passage.

The stator vane of the gas turbine is exposed to a high-temperature combustion gas. Therefore, the stator vane is generally cooled by air or the like.

For example, a plurality of cooling air passages through which cooling air passes are formed in the blade body of the stator vane disclosed in PTL 1 below. Each of the plurality of cooling air passages extends in a blade-height direction Dh, which is the radial direction with respect to the axis. The stator vane includes an impingement plate disposed in one cooling air passage of a plurality of cooling air passages. The impingement plate is disposed inside one cooling air passage to extend inside the one cooling air passage in the blade-height direction Dh, and to partition the inside of the one cooling air passage into a blade surface side of the blade body and an inner side opposite to the blade surface side. A plurality of impingement holes are formed in the impingement plate.

In the stator vane, inside the one cooling passage, the cooling air flowing into the inner side with the impingement plate as a reference is ejected to the blade surface side from the plurality of impingement holes of the impingement plate. The cooling air ejected from the plurality of impingement holes collides with a portion having a back-to-back relationship with the blade surface on a passage defining surface defining the one cooling air passage, and performs impingement cooling on the portion.

CITATION LIST

Patent Literature

[PTL 1] Japanese Patent No. 4885275

SUMMARY OF INVENTION

Technical Problem

With regard to the stator vane of the gas turbine, it is desirable to cool the stator vane and to reduce a usage amount of air for cooling the stator vane as much as possible while improving durability of the stator vane.

Therefore, an object of the present disclosure is to provide a stator vane capable of being efficiently cooled, and a gas turbine including the stator vane.

Solution to Problem

According to an aspect of the invention, in order to achieve the above-described object, there is provided a stator vane provided in a gas turbine.

The stator vane includes a blade body having a blade shape in a cross-section and extending in a blade-height direction having a direction component perpendicular to the cross section, a first insert and a second insert which have a tubular shape, extend in a tube-height direction, and are disposed inside the blade body so that the tube-height direction faces the blade-height direction, and an end cover. The blade body includes a plurality of blade air passages extending in the blade-height direction inside the blade body. In the plurality of blade air passages, both a first blade air passage and a second blade air passage have an open end on a blade-height one side which is one side of a blade-height first side and a blade-height second side in the blade-height direction. Both the first insert and the second insert have an outer peripheral plate portion having a tubular shape and extending in the tube-height direction, and a sealing plate portion that closes an end on a tube-height sealing side which is one side of the outer peripheral plate portion in the tube-height direction out of two sides in the tube-height direction. The outer peripheral plate portion has a plurality of impingement holes penetrating from an inside to an outside of the tubular outer peripheral plate portion. A tube-height opening side which is the other side of the outer peripheral plate portion in the tube-height direction is open. The outer peripheral plate portion of the first insert has a gap existing between the outer peripheral plate portion of the first insert and a first passage defining surface of the blade body defining the first blade air passage, and is disposed inside the first blade air passage so that cooling air flows into the outer peripheral plate portion from an opening of the first insert. The outer peripheral plate portion of the second insert is configured so that the tube-height opening side of the second insert faces the blade-height one side, has a gap existing between the outer peripheral plate portion of the second insert and a second passage defining surface of the blade body defining the second blade air passage, and is disposed inside the second blade air passage so that cooling air flows from an opening of the second insert. The end cover is provided on the blade-height one side of the blade body so that the cooling air ejected from the plurality of impingement holes of the first insert to between the outer peripheral plate portion of the first insert and the first passage defining surface is guided into the second insert from the opening of the second insert through the opening of the first blade air passage, and covers the opening of the first blade air passage and the opening of the second insert.

In the present aspect, the cooling air flowing into the first insert disposed inside the first blade air passage performs impingement cooling on the first passage defining surface. Furthermore, at least a portion of the cooling air flows into the second insert disposed inside the second blade air passage. The cooling air flowing into the second insert performs impingement cooling on the second passage defining surface. Therefore, in the present aspect, the stator vane can be more efficiently cooled, and a usage amount of the cooling air can be reduced, compared to when cooling air Ac flowing into one insert is ejected to a combustion gas passage immediately after the cooling air Ac performs the impingement cooling on the inside of the blade body.

According to another aspect of the invention, in order to achieve the above-described object, there is provided a gas turbine.

The gas turbine includes a stator vane of the above-described aspect, a rotor that rotates around an axis, and a casing that covers an outer peripheral side of the rotor. The stator vane is fixed to an inner peripheral surface of the casing.

Advantageous Effects of Invention

According to an aspect of the present disclosure, a stator vane can be effectively cooled, and a usage amount of cooling air can be minimized while durability is improved.

DESCRIPTION OF EMBODIMENTS

Hereinafter, various embodiments of the present invention and modification examples thereof will be described in detail with reference to the drawings.

[Embodiment of Gas Turbine]

An embodiment of a gas turbine will be described with reference to FIGS. 1 and 2.

Figure 1:
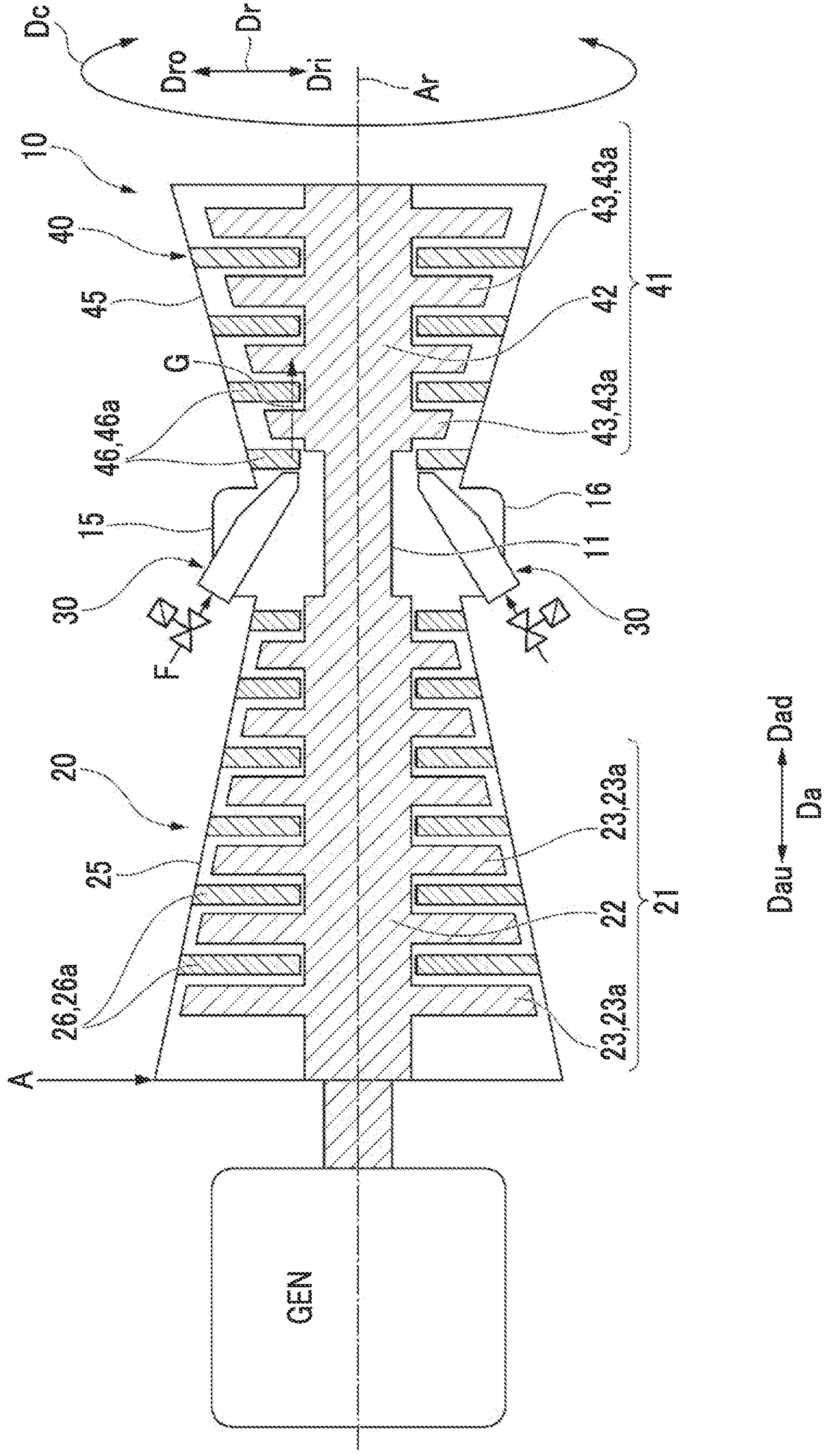
FIG. 1 is a schematic sectional view of a gas turbine according to an embodiment of the present disclosure.

As illustrated in FIG. 1, a gas turbine 10 of the present embodiment includes a compressor 20 that compresses air A; a combustor 30 that combusts a fuel F in the air A compressed by the compressor 20 to generate a combustion gas G; and a turbine 40 driven by the combustion gas G.

The compressor 20 includes a compressor rotor 21 that rotates around an axis Ar; a compressor casing 25 that covers the compressor rotor 21; and a plurality of stator vane rows 26. The turbine 40 includes a turbine rotor 41 that rotates around the axis Ar; a turbine casing 45 that covers the turbine rotor 41; and a plurality of stator vane rows 46. Hereinafter, an extending direction of the axis Ar will be referred to as an axial direction Da, a circumferential direction around the axis Ar will be simply referred to as a circumferential direction Dc, and a direction perpendicular to the axis Ar will be referred to as a radial direction Dr. In addition, one side in the axial direction Da will be referred to as an axial upstream side Dau, and a side opposite thereto will be referred to as an axial downstream side Dad. In addition, a side closer to the axis Ar in the radial direction Dr will be referred to as a radial inner side Dri, and a side opposite thereto will be referred to as a radial outer side Dro.

The compressor 20 is disposed on the axial upstream side Dau with respect to the turbine 40.

The compressor rotor 21 and the turbine rotor 41 are located on the same axis Ar, and are connected to each other to form a gas turbine rotor 11. For example, a rotor of a generator GEN is connected to the gas turbine rotor 11. The gas turbine 10 further includes an intermediate casing 16. The intermediate casing 16 is disposed between the compressor casing 25 and the turbine casing 45 in the axial direction Da. The compressor casing 25, the intermediate casing 16, and the turbine casing 45 are connected to each other to form a gas turbine casing 15.

The compressor rotor 21 includes a rotor shaft 22 extending in the axial direction Da around the axis Ar, and a plurality of rotor blade rows 23 attached to the rotor shaft 22. The plurality of rotor blade rows 23 are aligned in the axial direction Da. Each of the rotor blade rows 23 is formed of a plurality of rotor blades **23*a* aligned in the circumferential direction Dc. One stator vane row 26 of the plurality of stator vane rows 26 is disposed on the axial downstream side Dad of each of the plurality of rotor blade rows 23. Each of the stator vane rows 26 is provided inside the compressor casing 25. Each of the stator vane rows 26 is formed of a plurality of stator vanes 26*a*** aligned in the circumferential direction Dc.

Figure 2:
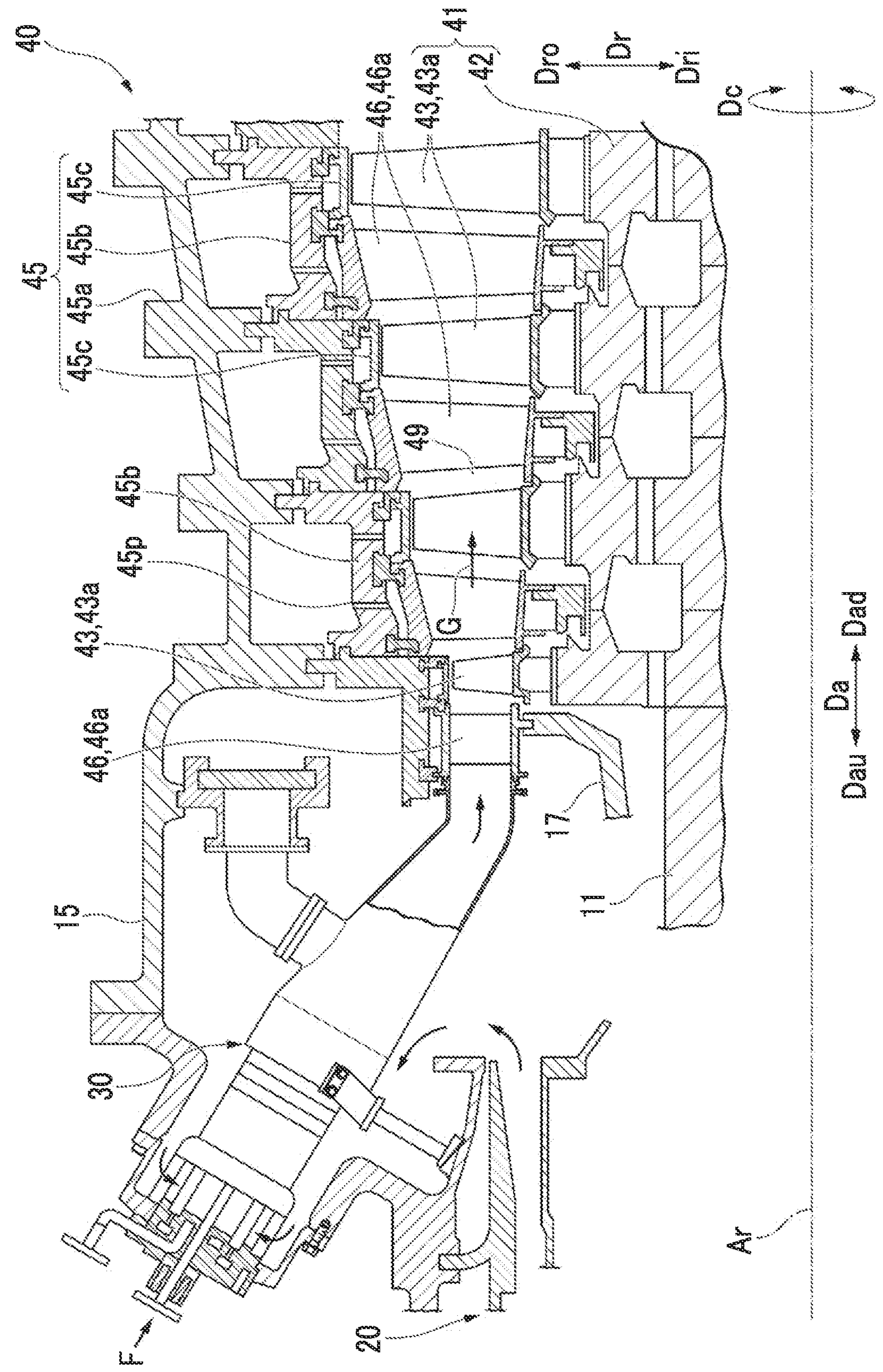
FIG. 2 is a sectional view illustrating a main part of the gas turbine according to the embodiment of the present disclosure.

As illustrated in FIGS. 1 and 2, the turbine rotor 41 includes a rotor shaft 42 extending in the axial direction Da around the axis Ar, and a plurality of rotor blade rows 43 attached to the rotor shaft 42. The plurality of rotor blade rows 43 are aligned in the axial direction Da. Each of the rotor blade rows 43 is formed of a plurality of rotor blades **43*a* aligned in the circumferential direction Dc. One stator vane row 46 of the plurality of stator vane rows 46 is disposed on the axial upstream side Dau of each of the plurality of rotor blade rows 43. Each of the stator vane rows 46 is provided inside the turbine casing 45. Each of the stator vane rows 46 is formed of a plurality of stator vanes 46*a*** aligned in the circumferential direction Dc.

The turbine casing 45 includes a tubular outer casing **45*a* forming an outer shell thereof, an inner casing 45*b* fixed to the inside of the outer casing 45*a*, and a plurality of ring segments 45*c* fixed to the inside of the inner casing 45*b***.

Each of the plurality of ring segments 45*c* is provided at a position between the plurality of stator vane rows 46. Therefore, the rotor blade row 43 is disposed on the radial inner side Dri of each of the ring segments 45*c*.

An annular space formed between an outer peripheral side of the rotor shaft 42 and an inner peripheral side of the turbine casing 45, in which the stator vane 46*a* and the rotor blade 43*a* are disposed in the axial direction Da, forms a combustion gas passage 49 through which the combustion gas G from the combustors 30 flows.

The combustor 30 is attached to the intermediate casing 16.

As illustrated in FIG. 1, the compressor 20 compresses the air A to generate compressed air. The compressed air flows into the combustor 30. The fuel F is supplied to the combustor 30. Inside the combustor 30, the fuel F is combusted in the compressed air to generate the high-temperature and high-pressure combustion gas G. The combustion gas G is fed from the combustor 30 to the combustion gas passage 49 inside the turbine 40. The combustion gas G rotates the turbine rotor 41 in a process of flowing through the combustion gas passage 49 to the axial downstream side Dad. A rotor of the generator GEN connected to the gas turbine rotor 11 is rotated by rotation of the turbine rotor 41. As a result, the generator GEN generates electricity.

Hereinafter, various embodiments relating to the stator vane forming a first-stage stator vane row 46 will be described.

[First Embodiment of Stator Vane]

A first embodiment of the stator vane according to the present invention will be described with reference to FIGS. 3 to 6.

Figure 3:
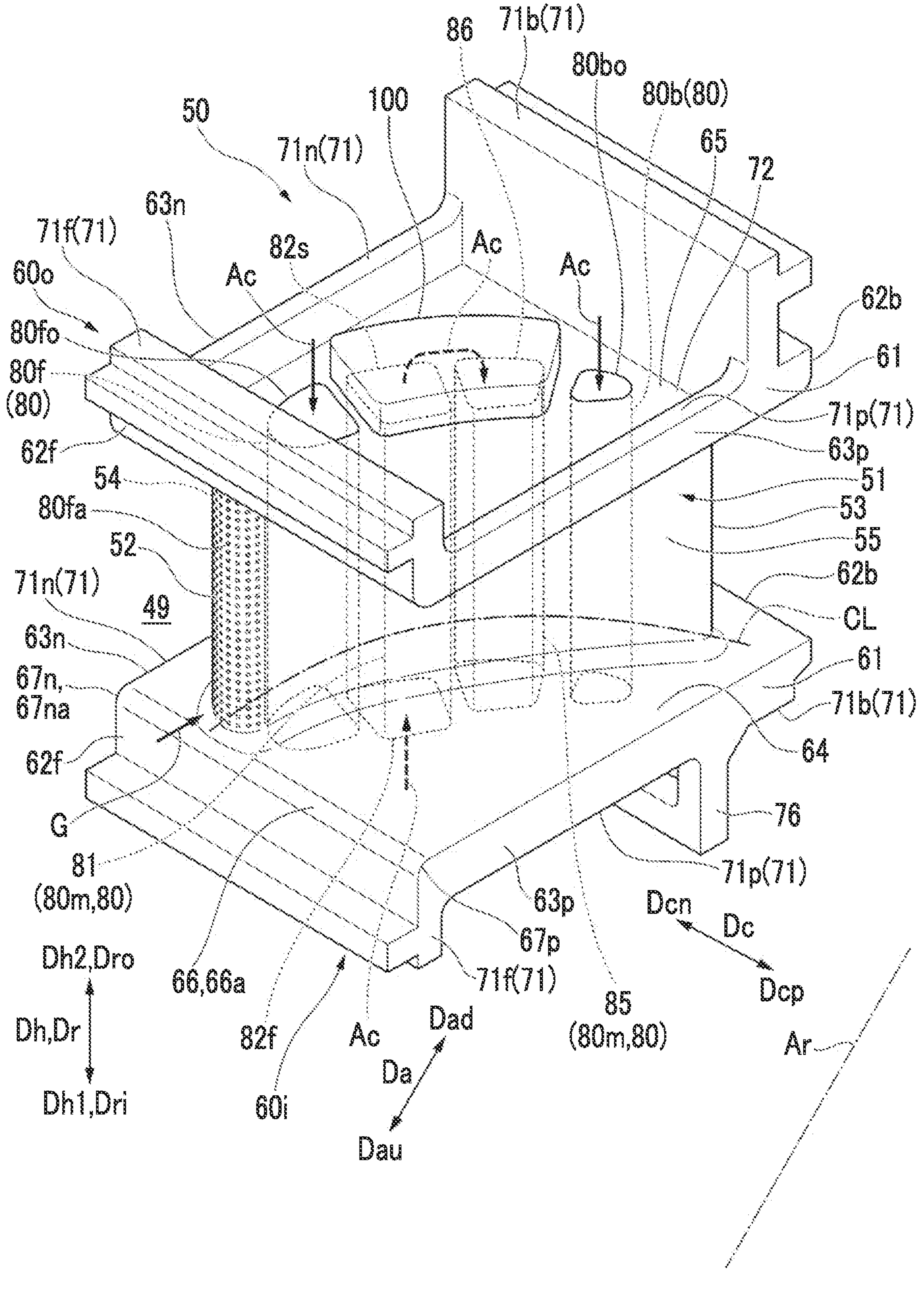
FIG. 3 is a perspective view of a stator vane according to a first embodiment of the present disclosure.

As illustrated in FIG. 3, a stator vane 50 of the present embodiment includes a blade body 51, an inner shroud 60*i*, and an outer shroud 60*o*. A shape of a cross section of the blade body 51 has a blade shape, and the blade body 51 extends in a blade-height direction Dh having a direction component perpendicular to the cross section. The inner shroud 60*i* is provided in an end on one side in the blade-height direction Dh in the blade body 51. The outer shroud 60*o* is provided in an end on the other side in the blade-height direction Dh in the blade body 51. The blade body 51, the inner shroud 60*i*, and the outer shroud 60*o* are integrally formed by casting or the like.

The blade-height direction is the radial direction Dr in a state where the stator vane 50 is attached to the turbine casing 45 (refer to FIG. 2). In addition, a blade-height first side Dh1 on one side in the blade-height direction Dh is the radial inner side Dri, and a blade-height second side Dh2 on the other side in the blade-height direction Dh is the radial outer side Dro. Therefore, the inner shroud 60*i* is provided on the radial inner side Dri of the blade body 51, and the outer shroud 60*o* is provided on the radial outer side Dro of the blade body 51. Therefore, in the present embodiment, in some cases, the blade-height direction Dh may be referred to as the radial direction Dr, the blade-height first side Dh1 may be referred to as the radial inner side Dri, and the blade-height second side Dh2 may be referred to as the radial outer side Dro.

Figure 4:
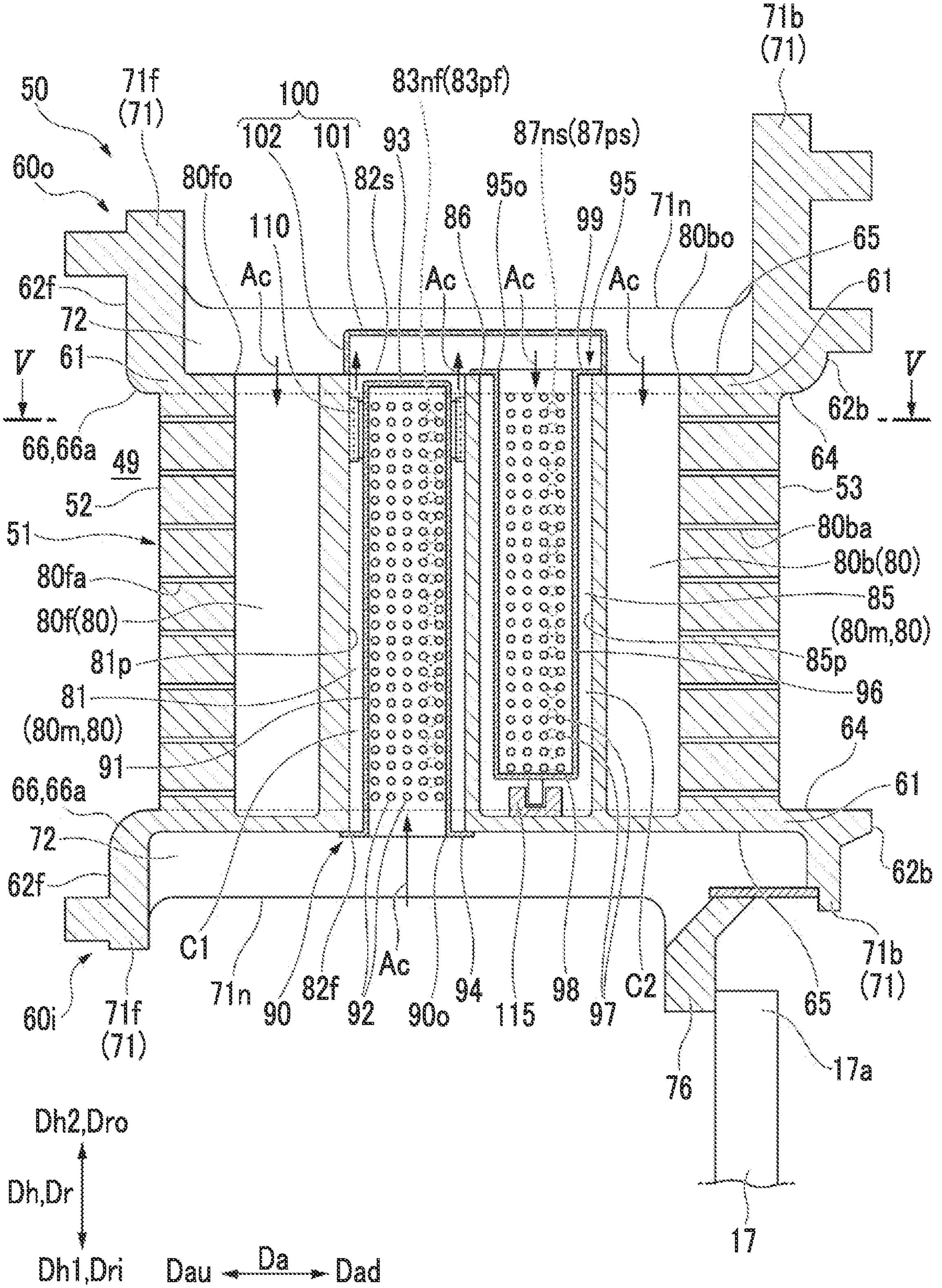
FIG. 4 is a sectional view of the stator vane on a plane including a camber line according to the first embodiment of the present disclosure.
Figure 5:
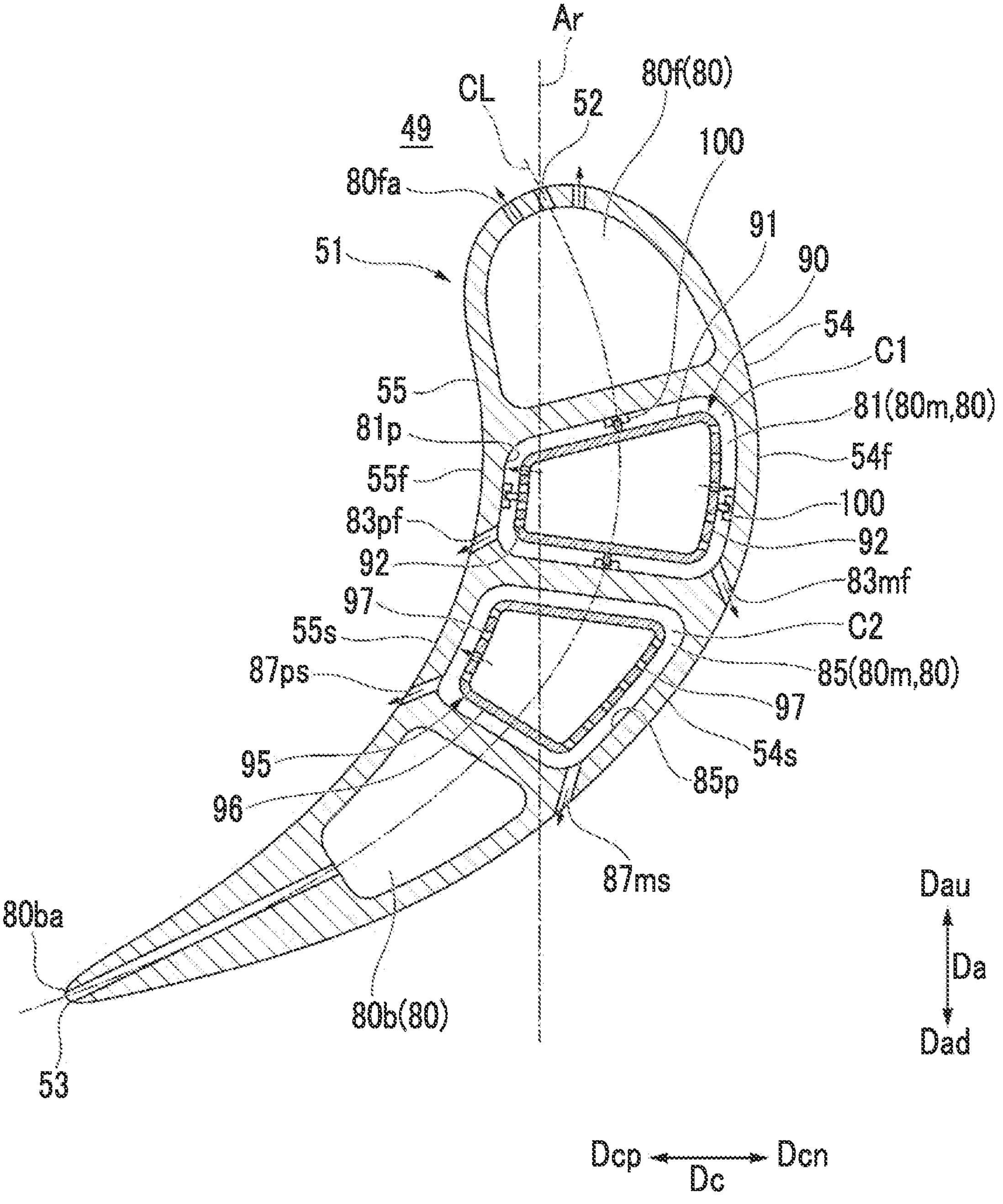
FIG. 5 is a sectional view taken along line V-V in FIG. 4.

As illustrated in FIGS. 3 to 5, a blade surface which is an outer surface of the blade body 51 includes a leading edge 52, a trailing edge 53, a suction surface 54 which is a convex surface, and a pressure surface 55 which is a concave surface. The leading edge 52 and the trailing edge 53 exist in a connecting portion between the suction surface 54 and the pressure surface 55. The leading edge 52, the trailing edge 53, the suction surface 54, and the pressure surface 55 all extend in the radial direction Dr which is the blade-height direction Dh. The leading edge 52 is located on the axial upstream side Dau with respect to the trailing edge 53 in a state where the stator vane 50 is attached to the turbine casing 45. In addition, in a state where the stator vane 50 is attached to the turbine casing 45, the suction surface 54 faces a circumferential suction side Dcn which is one side in the circumferential direction Dc, and the pressure surface 55 faces a circumferential pressure side Dcp which is the other side in the circumferential direction Dc.

The blade body 51 is disposed inside the combustion gas passage 49 through which the combustion gas G passes. The blade body 51 includes a plurality of blade air passages 80 extending in the radial direction Dr inside the blade body 51. The inner shroud 60*i* defines an edge on the radial inner side Dri of the annular combustion gas passage 49. In addition, the outer shroud 60*o* defines an edge on the radial outer side Dro of the annular combustion gas passage 49.

The inner shroud 60*i* includes a shroud body 61, a peripheral wall 71, and a retainer 76.

The shroud body 61 is a plate-shaped member that spreads in a direction including a direction component in a direction perpendicular to the radial direction Dr which is the blade-height direction Dh. The shroud body 61 includes a gas path surface 64, a counter-gas path surface 65, a front end surface 62*f*, a rear end surface 62*b*, a suction side end surface 63*n*, and a pressure side end surface 63*p*.

The gas path surface 64 is a surface facing the radial outer side Dro which is the blade-height second side Dh2, with which the combustion gas G comes into contact. The counter-gas path surface 65 is a surface facing the radial inner side Dri which is the blade-height first side Dh1. The counter-gas path surface 65 has a back-to-back relationship with the gas path surface 64. The front end surface 62*f* is a surface located closer to the axial upstream side Dau than the blade body 51 is, and facing the axial upstream side Dau. The rear end surface 62*b* is a surface located closer to the axial downstream side Dad than the blade body 51 is, and facing the axial downstream side Dad. The suction side end surface 63*n* is a surface located closer to the circumferential suction side Dcn than the blade body 51 is in the shroud body 61 and facing the circumferential suction side Dcn. The suction side end surface 63*n* connects the front end surface 62*f* and the rear end surface 62*b*. The pressure side end surface 63*p* is a surface located closer to the circumferential pressure side Dcp than the blade body 51 is in the shroud body 61 and facing the circumferential pressure side Dcp. The pressure side end surface 63*p* connects the front end surface 62*f* and the rear end surface 62*b*. The rear end surface 62*b* is located at an interval from the front end surface 62*f* to the axial downstream side, and is substantially parallel to the front end surface 62*f*. In addition, the pressure side end surface 63*p* is located at an interval from the suction side end surface 63*n* to one side in the circumferential direction Dc, and is substantially parallel to the suction side end surface 63*n*. Therefore, when viewed in the radial direction Dr, the shroud body 61 has a parallel quadrilateral shape.

The peripheral wall 71 is a wall protruding from the shroud body 61 to the radial inner side Dri along an outer peripheral edge of the shroud body 61. The peripheral wall 71 includes a front peripheral wall 71*f* and a rear peripheral wall 71*b* which face each other in the axial direction Da, and a pressure side peripheral wall 71*p* and a suction side peripheral wall 71*n* which face each other in the circumferential direction Dc. The front peripheral wall 71*f* is located closer to the axial upstream side Dau than the blade body 51 is. A surface of the front peripheral wall 71*f* facing the axial upstream side Dau forms a portion of the front end surface 62*f* of the inner shroud 60*i*. The rear peripheral wall 71*b* is located closer to the axial downstream side Dad than the blade body 51 is. The pressure side peripheral wall 71*p* is located closer to the circumferential pressure side Dcp than the blade body 51 is. A surface of the pressure side peripheral wall 71*p* facing the circumferential pressure side Dcp forms a portion of the pressure side end surface 63*p* of the inner shroud 60*i*. The suction side peripheral wall 71*n* is located closer to the circumferential suction side Dcn than the blade body 51 is. A surface of the suction side peripheral wall 71*n* facing the circumferential suction side Dcn forms a portion of the suction side end surface 63*n* of the inner shroud 60*i*.

In the inner shroud 60*i*, a cavity 72 recessed toward the radial inner side Dri is formed by the shroud body 61 and the peripheral wall 71. The cavity 72 is defined by the counter-gas path surface 65 of the shroud body 61, a surface of the front peripheral wall 71*f* facing the axial downstream side Dad, a surface of the rear peripheral wall 71*b* facing the axial upstream side Dau, a surface of the pressure side peripheral wall 71*p* facing the circumferential suction side Dcn, and a surface of the suction side peripheral wall 71*n* facing the circumferential pressure side Dcp.

The retainer 76 is located between the front peripheral wall 71*f* and the rear peripheral wall 71*b* in the axial direction Da, and is formed from the suction side end surface 63*n* to the pressure side end surface 63*p*. The retainer 76 is connected to an end 17*a* (refer to FIGS. 2 and 4) on the radial outer side Dro of an inner cover 17 fixed to the gas turbine casing 15, and serves to support a portion on the radial inner side Dri of the stator vane 50 on the inner cover 17.

The outer shroud 60*o* has essentially the same configuration as the configuration of the inner shroud 60*i*. Therefore, as in the inner shroud 60*i*, the outer shroud 60*o* also includes the shroud body 61 and the peripheral wall 71. However, the outer shroud 60*o* does not have a portion corresponding to the retainer 76 of the inner shroud 60*i*. As in the shroud body 61 of the inner shroud 60*i*, the shroud body 61 of the outer shroud 60*o* also includes the gas path surface 64, the counter-gas path surface 65, the front end surface 62*f*, the rear end surface 62*b*, the suction side end surface 63*n*, and the pressure side end surface 63*p*. In addition, as in the peripheral wall 71 of the inner shroud 60*i*, the peripheral wall 71 of the outer shroud 60*o* also includes the front peripheral wall 71*f*, the rear peripheral wall 71*b*, the pressure side peripheral wall 71*p*, and the suction side peripheral wall 71*n*. The front peripheral wall 71*f* and the rear peripheral wall 71*b* of the outer shroud 60*o* serve to attach the stator vane 50 to an inner peripheral side of the turbine casing 45 (refer to FIG. 2).

As illustrated in FIGS. 3 and 5, the plurality of blade air passages 80 formed inside the blade body 51 are aligned along a camber line CL of the blade body 51. Here, in the plurality of blade air passages 80, the blade air passage 80 closest to the axial upstream side Dau will be referred to as a front side blade air passage 80*f*, and the blade air passage 80 closest to the axial downstream side Dad will be referred to as a rear side blade air passage 80*b*. In addition, in the plurality of blade air passages 80, two blade air passages 80 between the front side blade air passage 80*f* and the rear side blade air passage 80*b* will be referred to as intermediate blade air passages 80*m*. Furthermore, out of the two intermediate blade air passages 80*m*, the intermediate blade air passage 80*m* on the axial upstream side Dau will be referred to as a first blade air passage 81, and the intermediate blade air passage 80*m* on the axial downstream side Dad will be referred to as a second blade air passage 85.

In the front side blade air passage 80*f*, an end on the radial inner side Dri which is the blade-height first side Dh1 is closed, and an end on the radial outer side Dro which is the blade-height second side Dh2 is open. A plurality of front side ejection holes 80*fa* penetrating from the front side blade air passage 80*f* to the combustion gas passage 49 are formed in a front side portion including the leading edge 52 of the blade body 51. An end on the radial inner side Dri of the blade body 51 forms a portion of the counter-gas path surface 65 of the inner shroud 60*i*, and an end on the radial outer side Dro of the blade body 51 forms a portion of the counter-gas path surface 65 of the outer shroud 60*o*. Therefore, an opening 80*fo* of the front side blade air passage 80*f* is open on the counter-gas path surface 65 of the outer shroud 60*o*.

In the rear side blade air passage 80*b*, an end on the radial inner side Dri which is the blade-height first side Dh1 is closed, and an end on the radial outer side Dro which is the blade-height second side Dh2 is open. An opening 80*bo* of the rear side blade air passage 80*b* is open on the counter-gas path surface 65 of the outer shroud 60*o*. A plurality of rear side ejection holes 80*ba* penetrating from the rear side blade air passage 80*b* to the combustion gas passage 49 are formed in a rear side portion including the trailing edge 53 of the blade body 51.

In the first blade air passage 81, an end on the radial inner side Dri which is the blade-height first side Dh1, and an end on the radial outer side Dro which is the blade-height second side Dh2 are open. A first opening 82*f* which is an opening on the blade-height first side Dh1 of the first blade air passage 81 is open on the counter-gas path surface 65 of the inner shroud 60*i*. In addition, a second opening 82*s* which is an opening on the blade-height second side Dh2 of the first blade air passage 81 is open on the counter-gas path surface 65 of the outer shroud 60*o*. The blade body 51 has a plurality of pressure side first ejection holes 83*pf* penetrating from a first passage defining surface 81*p* defining the first blade air passage 81 of the blade body 51 to a pressure side first blade surface portion 55*f* which is a portion of the pressure surface 55. The pressure side first blade surface portion 55*f* is a portion having a back-to-back relationship with the first blade air passage 81 on the pressure surface 55 of the blade body 51. In addition, the blade body 51 has a plurality of suction side first ejection holes 83*nf* penetrating from the first passage defining surface 81*p* defining the first blade air passage 81 of the blade body 51 to a suction side first blade surface portion 54*f* which is a portion of the suction surface 54. The suction side first blade surface portion 54*f* is a portion having a back-to-back relationship with the first blade air passage 81 on the suction surface 54 of the blade body 51.

In the second blade air passage 85, an end on the radial inner side Dri which is the blade-height first side Dh1 is closed, and an end on the radial outer side Dro which is the blade-height second side Dh2 is open. An opening 86 of the second blade air passage 85 is open on the counter-gas path surface 65 of the outer shroud 60*o*. The blade body 51 has a plurality of pressure side second ejection holes 87*ps* penetrating from a second passage defining surface 85*p* defining the second blade air passage 85 of the blade body 51 to a pressure side second blade surface portion 55*s* which is a portion of the pressure surface 55.

The pressure side second blade surface portion 55*s* is a portion having a back-to-back relationship with the second blade air passage 85 on the pressure surface 55 of the blade body 51. In addition, the blade body 51 has a plurality of suction side second ejection holes 87*ns* penetrating from the second passage defining surface 85*p* defining the second blade air passage 85 of the blade body 51 to a suction side second blade surface portion 54*s* which is a portion of the suction surface 54. The suction side second blade surface portion 54*s* is a portion having a back-to-back relationship with the second blade air passage 85 on the suction surface 54 of the blade body 51.

As described above, in both the first blade air passage 81 and the second blade air passage 85, an end on the radial outer side Dro which is the blade-height second side Dh2 is open.

In addition, as illustrated in FIGS. 3 to 6, the stator vane of the present embodiment further includes a first insert 90, a second insert 95, an end cover 100, a plurality of first guide members 110, and a second guide member 115.

Figure 6:
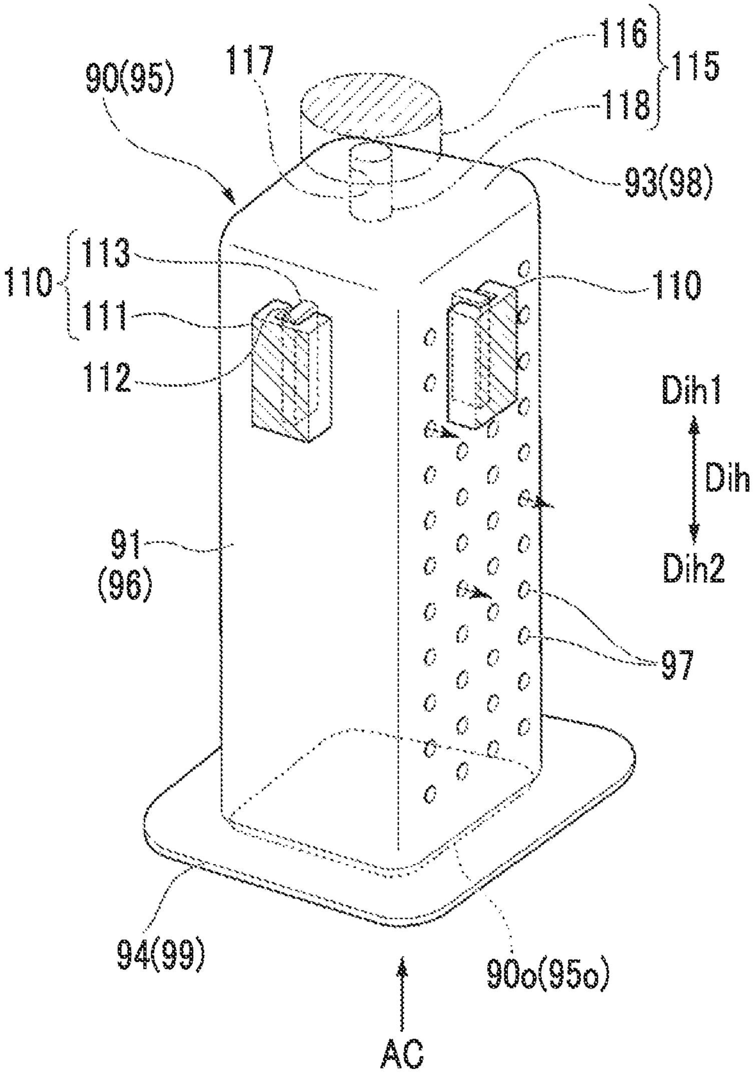
FIG. 6 is a perspective view of an insert according to the first embodiment of the present disclosure.

The first insert 90 is disposed inside the first blade air passage 81, and the second insert 95 is disposed inside the second blade air passage 85. As illustrated in FIG. 6, the first insert 90 includes an outer peripheral plate portion 91, a sealing plate portion 93, and a flange portion 94. In addition, the second insert 95 includes an outer peripheral plate portion 96, a sealing plate portion 98, and a flange portion 99. The outer peripheral plate portions 91 and 96 of the first insert 90 and the second insert 95 have a tubular shape, and extend in a tube-height direction Dih. Here, out of two sides in the tube-height direction Dih, one side will be referred to as a tube-height sealing side Dih1, and the other side will be referred to as a tube-height opening side Dih2. The sealing plate portions 93 and 98 close ends of the outer peripheral plate portions 91 and 96 on the tube-height sealing side Dih1. Meanwhile, the sealing plate portion is not provided in end portions of the outer peripheral plate portions 91 and 96 on the tube-height opening side Dih2. Therefore, insert openings 90*o* and 95*o* for introducing the cooling air into the outer peripheral plate portions 91 and 96 are formed in the end portions of the outer peripheral plate portions 91 and 96 on the tube-height opening side Dih2. The flange portions 94 and 99 spread toward the outer peripheral side from the ends on the tube-height opening side Dih2 on all of the outer peripheral surfaces of the outer peripheral plate portions 91 and 96.

The outer peripheral plate portion 91 of the first insert 90 is disposed inside the first blade air passage 81 so that the tube-height opening side Dih2 faces the blade-height first side Dh1 and a gap exists between the outer peripheral plate portion 91 and the first passage defining surface 81*p* of the blade body 51 defining the first blade air passage 81. The flange portion 94 is connected to an edge of the first opening 82*f* of the first blade air passage 81 to close the gap between the outer peripheral plate portion 91 and the first passage defining surface 81*p*. The gap between the outer peripheral side of the outer peripheral plate portion 91 of the first insert 90 and the first passage defining surface 81*p* forms an intra-blade first cavity C1 into which the cooling air Ac flows.

In the outer peripheral plate portion 91 of the first insert 90, a portion facing the pressure side first blade surface portion 55*f* and a portion facing the suction side first blade surface portion 54*f* have a plurality of impingement holes 92 penetrating from the inside to the outside of the outer peripheral plate portion 91.

The outer peripheral plate portion 96 of the second insert 95 is disposed inside the second blade air passage 85 so that the tube-height opening side Dih2 faces the blade-height second side Dh2, and a gap exists between the outer peripheral plate portion 96 and the second passage defining surface 85*p* of the blade body 51 defining the second blade air passage 85. The flange portion 99 is connected to an edge of the opening 86 of the second blade air passage 85 to close the gap between the outer peripheral plate portion 96 and the second passage defining surface 85*p*. The gap between the outer peripheral side of the outer peripheral plate portion 96 of the second insert 95 and the second passage defining surface 85*p* forms an intra-blade second cavity C2 into which the cooling air Ac flows.

In the outer peripheral plate portions 96 of the second insert 95, a portion facing the pressure side second blade surface portion 55*s* and a portion facing the suction side second blade surface portion 54*s* have a plurality of impingement holes 97 penetrating from the inside to the outside of the outer peripheral plate portion 96.

The second blade surface portions 54*s* and 55*s* on the blade surface are located closer to the axial downstream side Dad than the first blade surface portions 54*f* and 55*f* are. Therefore, positions of the second blade surface portions 54*s* and 55*s* are positions where the pressure of the portions along the second blade surface portions 54*s* and 55*s* outside the blade body 51 is lower than the pressure of the portions along the first blade surface portions 54*f* and 55*f* outside the blade body 51, while the gas turbine 10 is driven.

The end cover 100 includes a top plate portion 101 and an outer peripheral plate portion 102. The outer peripheral plate portion 102 extends along an edge of the top plate portion 101 in a direction substantially perpendicular to the top plate portion 101. The end cover 100 is disposed on the blade-height second side Dh2 of the blade body 51. The top plate portion 101 faces a region where the first blade air passage 81 and the second air passage are disposed on the counter-gas path surface 65 of the outer shroud 60*o* at an interval in the blade-height direction Dh. The outer peripheral plate portion 102 of the end cover 100 is connected to an edge of a region where the first blade air passage 81 and the second air passage exist on the counter-gas path surface 65 of the outer shroud 60*o*. Therefore, the end cover 100 can guide the cooling air Ac flowing out from the second opening 82*s* of the first blade air passage 81 into the second blade air passage 85 from the opening 86 of the second blade air passage 85.

As illustrated in FIG. 6, each of the plurality of first guide members 110 includes a first groove member 111 having a first groove 112 extending in the tube-height direction Dih, and a first convex member 113 entering the inside of the first groove 112 and relatively movable in the tube-height direction Dih with respect to the first groove 112. The plurality of first groove members 111 are fixed to the first passage defining surface 81*p* at an interval in the circumferential direction of the first passage defining surface 81*p* (refer to FIGS. 4 and 5). Each of the plurality of first convex members 113 is disposed to enter any one first groove 112 of the first grooves 112 of the plurality of first groove members 111, and is fixed to the outer peripheral plate portion 91 of the first insert 90. Therefore, the first guide member 110 allows displacement of the first insert 90 in the tube-height direction Dih, and regulates displacement of the first insert 90 in a direction perpendicular to the tube-height direction Dih.

As illustrated in FIG. 6, the second guide member 115 includes a second groove member 116 having a second groove 117 extending in the tube-height direction Dih, and a second convex member 118 entering the second groove 117 and relatively movable in the tube-height direction Dih with respect to the second groove 117. The second groove member 116 is fixed to a bottom surface defining a surface of the second blade air passage 85 on the blade-height first side Dh1 on the second passage defining surface 85*p* (refer to FIG. 4). The second convex member 118 is disposed to enter the second groove 117 of the second groove member 116, and is fixed to the sealing plate portion 98 of the second insert 95. Therefore, the second guide member 115 allows displacement of the second insert 95 in the tube-height direction Dih, and regulates displacement of the second insert 95 in a direction perpendicular to the tube-height direction Dih.

The cooling air Ac flows into the cavity 72 of the outer shroud 60*o* from the radial outer side Dro of the outer shroud 60*o*. In addition, the cooling air Ac flows into the cavity 72 of the inner shroud 60*i* from the radial inner side Dri of the inner shroud 60*i*. For example, as the cooling air Ac, air compressed by the compressor 20 is used.

The cooling air Ac flowing into the cavity 72 of the outer shroud 60*o* cools the outer shroud 60*o*. In particular, the cooling air Ac cools the gas path surface of the outer shroud 60*o*.

A portion of the cooling air Ac flowing into the cavity 72 of the outer shroud 60*o* flows into the front side blade air passage 80*f* from the opening 80*fo* of the front side blade air passage 80*f*. The cooling air Ac performs convection cooling on a portion around the front side blade air passage 80*f* in the blade body 51. Furthermore, the cooling air Ac is ejected into the combustion gas passage 49 from the plurality of front side ejection holes 80*fa* toward the axial upstream side Dau. In a process of flowing through the plurality of front side ejection holes 80*fa*, the cooling air Ac performs convection cooling on a portion around the plurality of front side ejection holes 80*fa*. A portion of the cooling air Ac ejected into the combustion gas passage 49 prevents a front portion of the blade surface including the leading edge 52 of the blade body 51 from being exposed to the combustion gas G, and prevents the front portion of the blade surface from being heated by the combustion gas G.

The other portion of the cooling air Ac flowing into the cavity 72 of the outer shroud 60*o* flows into the rear side blade air passage 80*b* from the opening 80*bo* of the rear side blade air passage 80*b*. The cooling air Ac performs convection cooling on a portion around the rear side blade air passage 80*b* in the blade body 51. Furthermore, the cooling air Ac is ejected into the combustion gas passage 49 from the plurality of rear side ejection holes 80*ba* toward the axial downstream side Dad. In a process of flowing through the plurality of rear side ejection holes 80*ba*, the cooling air Ac performs convection cooling on a portion around the plurality of rear side ejection holes 80*ba*. A portion of the cooling air Ac ejected into the combustion gas passage 49 prevents a rear portion of the blade surface including the trailing edge 53 of the blade body 51 from being exposed to the combustion gas G, and prevents the rear portion of the blade surface from being heated by the combustion gas G. Furthermore, a portion of the cooling air Ac ejected into the combustion gas passage 49 prevents a vortex flow from being formed on the axial downstream side Dad of the blade body 51.

The cooling air Ac flowing into the cavity 72 of the inner shroud 60*i* cools the inner shroud 60*i*. In particular, the cooling air Ac cools the gas path surface 64 of the inner shroud 60*i*.

The cooling air Ac flowing into the cavity 72 of the inner shroud 60*i* flows into the outer peripheral plate portion 91 of the first insert 90 from the first opening 82*f* of the first blade air passage 81 and the insert opening 90*o* of the first insert 90. The cooling air Ac flowing into the outer peripheral plate portion 91 is ejected to the outer peripheral side of the outer peripheral plate portion 91 from the plurality of impingement holes 92 formed in the outer peripheral plate portion 91, and flows into the intra-blade first cavity C1. The cooling air Ac collides with a portion having a back-to-back relationship with the pressure side first blade surface portion 55*f* and a portion having a back-to-back relationship with the suction side first blade surface portion 54*f* on the first passage defining surface 81*p*, and performs impingement cooling on these portions. The impingement cooling has a higher cooling effect on a cooling target, compared to the convection cooling. A distance between an ejection port of the cooling air Ac and a surface with which the cooling air Ac ejected from the ejection port collides affects a cooling effect in the impingement cooling. Therefore, the present embodiment is provided with the first guide member 110 that regulates the displacement of the first insert 90 in the direction perpendicular to the tube-height direction Dih while allowing the displacement of the first insert 90 in the tube-height direction Dih.

In the present embodiment, the first groove member 111 of the first guide member 110 is fixed to the first passage defining surface 81*p*, and the first convex member 113 of the first guide member 110 is fixed to the outer peripheral plate portion 91 of the first insert 90. However, the first groove member 111 may be fixed to the outer peripheral plate portion 91 of the first insert 90, and the first convex member 113 may be fixed to the first passage defining surface 81*p*. In addition, one member of the first groove member 111 and the first convex member 113 may be fixed to the first insert 90, and the other member may be fixed to the end cover 100. However, the end cover 100 has a lower rigidity, compared to the blade body 51. Therefore, from a viewpoint of regulating the displacement of the first insert 90 in the direction perpendicular to the tube-height direction Dih, it is preferable to fix the other member to a side of the blade body 51.

A portion of the cooling air Ac flowing into the intra-blade first cavity C1 is ejected into the combustion gas passage 49 from the plurality of pressure side first ejection holes 83*pf* and the plurality of suction side first ejection holes 83*nf*. The cooling air Ac ejected from the plurality of pressure side first ejection holes 83*pf* performs film cooling mainly on a downstream side portion of the pressure side first blade surface portion 55*f* on the blade surface. In addition, the cooling air Ac ejected from the plurality of suction side first ejection holes 83*nf* performs film cooling mainly on a downstream side portion of the suction side first blade surface portion 54*f* on the blade surface.

The remaining portion of the cooling air Ac flowing into the intra-blade first cavity C1 flows inside the intra-blade first cavity C1 toward the radial outer side Dro which is the blade-height second side Dh2, flows out from the second opening 82*s* of the first blade air passage 81, and flows into the end cover 100. The cooling air Ac performs the convection cooling around the intra-blade first cavity C1 in the blade body 51 in a process of flowing inside the intra-blade first cavity C1.

The cooling air Ac flowing into the end cover 100 flows into the outer peripheral plate portion 96 of the second insert 95 from the opening 86 of the second blade air passage 85 and the insert opening 95*o* of the second insert 95. The cooling air Ac flowing into the outer peripheral plate portion 96 is ejected to the outer peripheral side of the outer peripheral plate portion 96 from the plurality of impingement holes 97 formed in the outer peripheral plate portion

96, and flows into the intra-blade second cavity C2. The cooling air Ac collides with a portion having a back-to-back relationship with the pressure side second blade surface portion 55*s* and a portion having a back-to-back relationship with the suction side second blade surface portion 54*s* on the second passage defining surface 85*p*, and performs the impingement cooling on these portions. As described above, a distance between the ejection port of the cooling air Ac and the surface with which the cooling air Ac ejected from the ejection port collides affects the cooling effect in the impingement cooling. Therefore, the present embodiment is provided with the first guide member 110 that regulates the displacement of the second insert 95 in the direction perpendicular to the tube-height direction Dih while allowing the displacement of the second insert 95 in the tube-height direction Dih.

In the present embodiment, the second groove member 116 of the second guide member 115 is fixed to the second passage defining surface 85*p*, and the second convex member 118 of the second guide member 115 is fixed to the sealing plate portion 98 of the second insert 95. However, the second groove member 116 may be fixed to the sealing plate portion 98 of the second insert 95, and the second convex member 118 may be fixed to the second passage defining surface 85*p*.

The cooling air Ac flowing into the intra-blade second cavity C2 is ejected into the combustion gas passage 49 from the plurality of pressure side second ejection holes 87*ps* and the plurality of suction side second ejection holes 87*ns*. The cooling air Ac ejected from the plurality of pressure side second ejection holes 87*ps* performs the film cooling mainly on a downstream side portion of the pressure side second blade surface portion 55*s* on the blade surface. In addition, the cooling air Ac ejected from the plurality of suction side second ejection holes 87*ns* performs the film cooling mainly on a downstream side portion of the suction side second blade surface portion 54*s* on the blade surface.

As described above, in the present embodiment, the cooling air Ac flowing into the first insert 90 disposed inside the first blade air passage 81 performs the impingement cooling on the first passage defining surface 81*p*. Furthermore, a portion of the cooling air Ac performs the film cooling on the downstream side portion of the pressure side first blade surface portion 55*f* and the downstream side portion of the suction side second blade surface portion 54*s*, and the remaining portion of the cooling air Ac performs the convection cooling around the intra-blade first cavity C1 in the blade body 51 in a process of flowing inside the intra-blade first cavity C1. In the present embodiment, the remaining portion of the cooling air Ac flows into the second insert 95 disposed inside the second blade air passage 85. The cooling air Ac flowing into the second insert 95 performs the impingement cooling on the second passage defining surface 85*p*. Furthermore, the cooling air Ac performs the film cooling on the downstream side portion of the pressure side second blade surface portion 55*s* and the downstream side portion of the suction side second blade surface portion 54*s*. Therefore, in the present embodiment, the stator vane 50 can be more efficiently cooled, and a usage amount of the cooling air Ac can be reduced, compared to when the cooling air Ac flowing into one insert is ejected to the combustion gas passage immediately after the cooling air Ac performs the impingement cooling on the inside of the blade body.

[Second Embodiment of Stator Vane]

Figure 7:
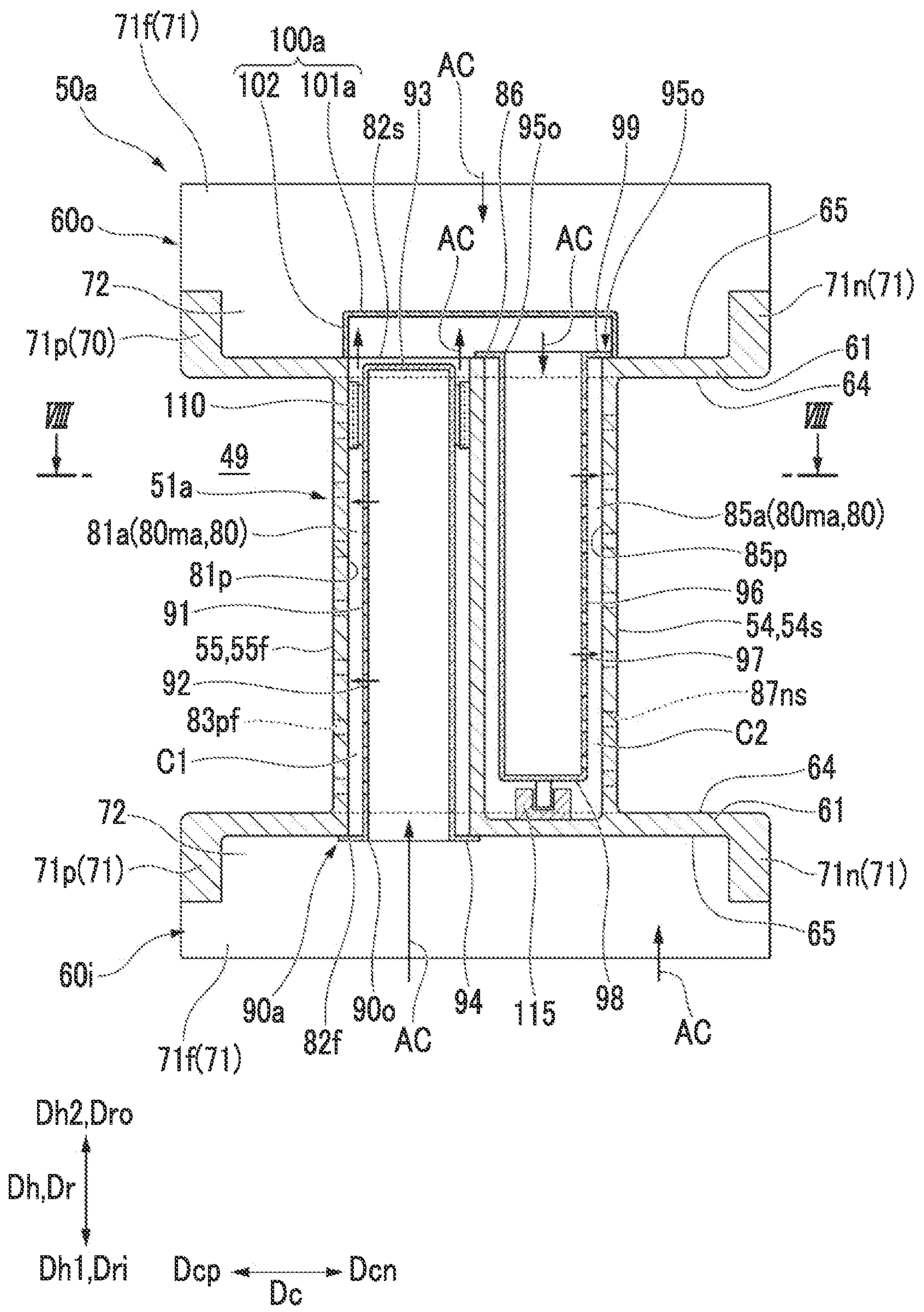
FIG. 7 is a sectional view of a stator vane on a plane perpendicular to an axis according to a second embodiment of the present disclosure.

Hereinafter, a second embodiment of the stator vane according to the present invention will be described with reference to FIGS. 7 and 8. FIG. 7 is a sectional view taken along a plane perpendicular to the axis Ar of the stator vane. In addition, FIG. 8 is a sectional view taken along line VIII-VIII in FIG. 7.

As illustrated in FIG. 7, a stator vane 50*a* of the present embodiment also includes a blade body 51*a*, the inner shroud 60*i*, and the outer shroud 60*o*. The inner shroud 60*i* and the outer shroud 60*o* of the present embodiment are the same as the inner shroud 60*i* and the outer shroud 60*o* of the first embodiment.

Figure 8:
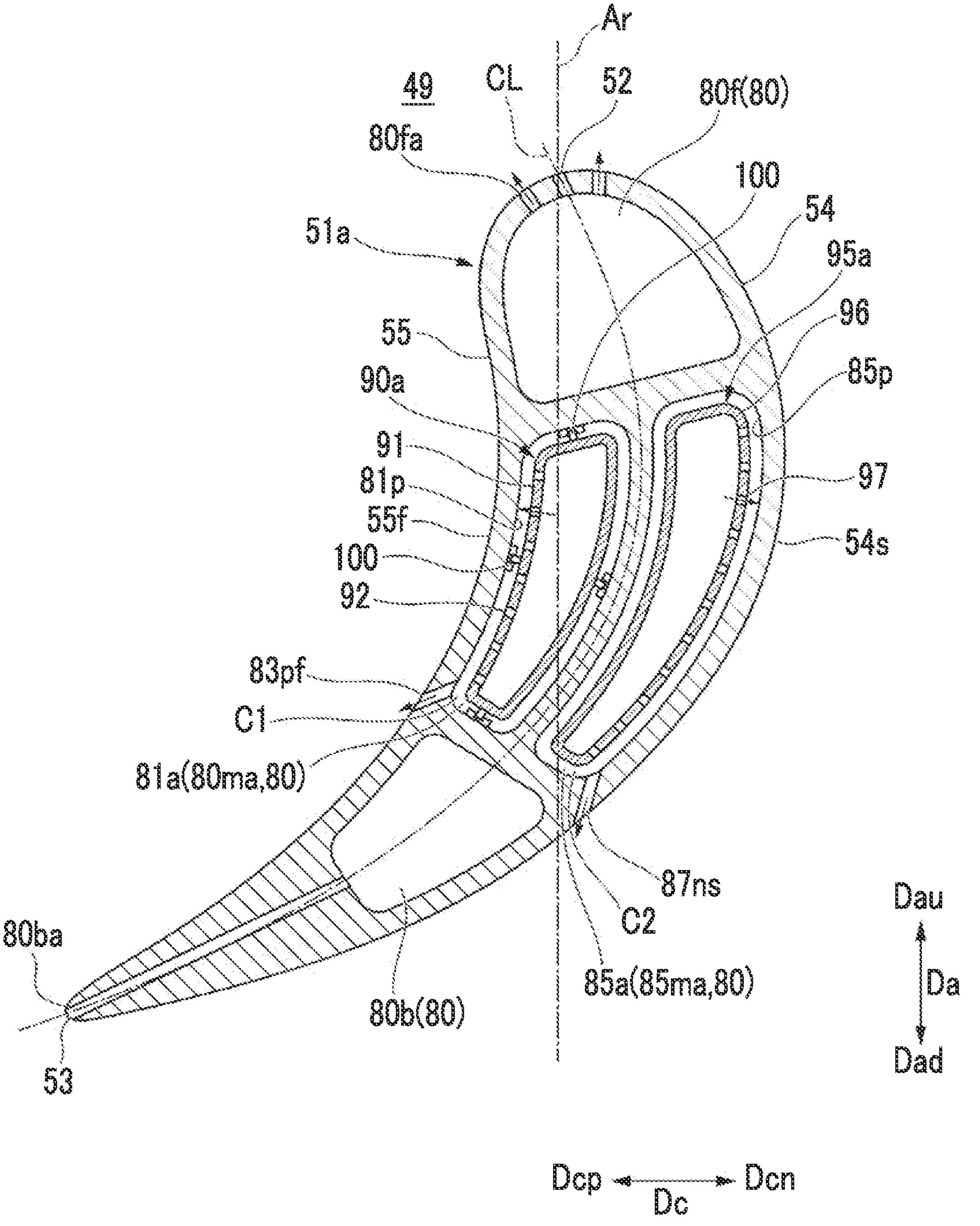
FIG. 8 is a sectional view taken along line VIII-VIII in FIG. 7.

As illustrated in FIGS. 7 and 8, as in the blade body 51 of the first embodiment, the plurality of blade air passages 80 are formed in the blade body 51*a* of the present embodiment. In the plurality of blade air passages 80, the blade air passage 80 closest to the axial upstream side Dau forms the front side blade air passage 80*f*, and the blade air passage 80 closest to the axial downstream side Dad forms the rear side blade air passage 80*b*. The configuration of the front side blade air passage 80*f* is the same as the configuration of the front side blade air passage 80*f* of the first embodiment. In addition, the configuration of the rear side blade air passage 80*b* is the same as the configuration of the rear side blade air passage 80*b* of the first embodiment. In addition, in the plurality of blade air passages 80, two blade air passages 80 between the front side blade air passage 80*f* and the rear side blade air passage 80*b* form intermediate blade air passages 80*ma*. The two intermediate blade air passages 80*ma* are aligned in the circumferential direction Dc, unlike the two intermediate blade air passages 80*m* of the first embodiment. Here, in the two intermediate blade air passages 80*ma*, the intermediate blade air passage 80*ma* on the circumferential pressure side Dcp will be referred to as a first blade air passage 81*a*, and the intermediate blade air passage 80*ma* on the circumferential suction side Dcn will be referred to as a second blade air passage 85*a*.

In the first blade air passage 81*a*, an end on the radial inner side Dri which is the blade-height first side Dh1 and an end on the radial outer side Dro which is the blade-height second side Dh2 are open. The first opening 82*f* which is an opening on the radial inner side Dri of the first blade air passage 81*a* is open on the counter-gas path surface 65 of the inner shroud 60*i*. In addition, the second opening 82*s* which is an opening on the radial outer side Dro of the first blade air passage 81*a* is open on the counter-gas path surface 65 of the outer shroud 60*o*. The blade body 51*a* has a plurality of pressure side first ejection holes 83*pf* penetrating from the first passage defining surface 81*p* defining the first blade air passage 81*a* of the blade body 51*a* to the pressure side first blade surface portion 55*f* which is a portion of the pressure surface 55. The pressure side first blade surface portion 55*f* is a portion having a back-to-back relationship with the first blade air passage 81*a* on the pressure surface 55 of the blade body 51*a*.

In the second blade air passage 85*a*, an end on the radial inner side Dri which is the blade-height first side Dh1 is closed, and an end on the radial outer side Dro which is the blade-height second side Dh2 is open. The opening 86 of the second blade air passage 85*a* is open on the counter-gas path surface 65 of the outer shroud 60*o*. The blade body 51*a* has a plurality of suction side second ejection holes 87*ns* penetrating from the second passage defining surface 85*p* defining the second blade air passage 85*a* of the blade body 51*a* to the suction side second blade surface portion 54*s* which is a portion of the suction surface 54. The suction side second blade surface portion 54*s* is a portion having a back-to-back relationship with the second blade air passage 85*a* on the suction surface 54 of the blade body 51*a*.

In the present embodiment, in both the first blade air passage 81*a* and the second blade air passage 85*a*, the end on the radial outer side Dro which is the blade-height second side Dh2 is also open.

The stator vane 50*a* of the present embodiment also further includes a first insert 90*a*, a second insert 95*a*, an end cover 100*a*, the plurality of first guide members 110, and the second guide member 115.

The first insert 90*a* is disposed inside the first blade air passage 81*a*, and the second insert 95*a* is disposed inside the second blade air passage 85*a*. As in the first insert 90 of the first embodiment, the first insert 90*a* includes the outer peripheral plate portion 91, the sealing plate portion 93, and the flange portion 94. In addition, as in the second insert 95 of the first embodiment, the second insert 95*a* includes the outer peripheral plate portion 96, the sealing plate portion 98, and the flange portion 99. The outer peripheral plate portions 91 and 96 of the first insert 90*a* and the second insert 95*a* form a tubular shape, and extend in the tube-height direction Dih. The sealing plate portions 93 and 98 close ends of the outer peripheral plate portions 91 and 96 on the tube-height sealing side Dih1. Meanwhile, the sealing plate portion is not provided in end portions of the outer peripheral plate portions 91 and 96 on the tube-height opening side Dih2. Therefore, the insert openings 90*o* and 95*o* for introducing the cooling air Ac into the outer peripheral plate portions 91 and 96 are formed in end portions of the outer peripheral plate portions 91 and 96 on the tube-height opening side Dih2. The flange portions 94 and 99 spread toward the outer peripheral side from the ends on the tube-height opening side Dih2 on all of the outer peripheral surfaces of the outer peripheral plate portions 91 and 96.

The outer peripheral plate portion 91 of the first insert 90*a* is disposed inside the first blade air passage 81*a* so that the tube-height opening side Dih2 faces the blade-height first side Dh1, and a gap exists between the outer peripheral plate portion 91 and the first passage defining surface 81*p* of the blade body 51*a* defining the first blade air passage 81*a*. The flange portion 94 is connected to an edge of the first opening 82*f* of the first blade air passage 81*a* to close the gap between the outer peripheral plate portion 91 and the first passage defining surface 81*p*. The gap between the outer peripheral side of the outer peripheral plate portion 91 of the first insert 90*a* and the first passage defining surface 81*p* forms the intra-blade first cavity C1 into which the cooling air Ac flows.

The plurality of impingement holes 92 penetrating from the inside to the outside of the outer peripheral plate portion 91 are formed in a portion facing the pressure side first blade surface portion 55*f* in the outer peripheral plate portion 91 of the first insert 90*a*.

The outer peripheral plate portion 96 of the second insert 95*a* is disposed inside the second blade air passage 85*a* so that the tube-height opening side Dih2 faces the blade-height second side Dh2, and a gap exists between the outer peripheral plate portions 91 and 96 and the second passage defining surface 85*p* of the blade body 51*a* defining the second blade air passage 85*a*. The flange portions 94 and 99 are connected to the edge of the opening of the second blade air passage 85*a* to close the gap between the outer peripheral plate portions 91 and 96 and the second passage defining surface 85*p*. The gap between the outer peripheral side of the outer peripheral plate portions 91 and 96 of the second insert 95*a* and the second passage defining surface 85*p* forms the intra-blade second cavity C2 into which the cooling air Ac flows.

The plurality of impingement holes 97 penetrating from the inside to the outside of the outer peripheral plate portion 96 are formed in a portion facing the suction side second blade surface portion 54*s* in the outer peripheral plate portion 96 of the second insert 95*a*.

The second blade surface portion 54*s* is a portion of the suction surface 54, and the first blade surface portion 55*f* is a portion of the pressure surface 55. Therefore, a position of the second blade surface portion 54*s* is a position where the pressure of the portion along the second blade surface portion 54*s* outside the blade body 51*a* is lower than the pressure of the portion along the first blade surface portion 55*f* outside the blade body 51*a*, while the gas turbine 10 is driven.

As in the end cover 100 of the first embodiment, the end cover 100*a* includes a top plate portion 101*a* and the outer peripheral plate portion 102. However, in the present embodiment, an alignment direction of the second blade air passage 85*a* with respect to the first blade air passage 81*a* is different from that in the first embodiment. Therefore, a shape of the top plate portion 101*a* is different from a shape of the top plate portion 101 of the first embodiment. As in the end cover 100 of the first embodiment, the end cover 100*a* can also guide the cooling air Ac flowing out from the second opening 82*s* of the first blade air passage 81*a* into the second blade air passage 85*a* from the opening 86 of the second blade air passage 85*a*.

The first guide member 110 is the same as the first guide member 110 of the first embodiment. In addition, the second guide member 115 is the same as the second guide member 115 of the first embodiment.

A flow of the cooling air Ac of the present embodiment is the same as a flow of the cooling air Ac of the first embodiment. Therefore, in the present embodiment, the cooling air Ac flowing into the first insert 90*a* disposed inside the first blade air passage 81*a* also performs the impingement cooling on the first passage defining surface 81*p*. Furthermore, a portion of the cooling air Ac performs the film cooling on a downstream side portion of the pressure side first blade surface portion 55*f*, and the remaining portion performs the convection cooling around the intra-blade first cavity C1 in the blade body 51*a* in a process of flowing inside the intra-blade first cavity C1. The remaining portion of the cooling air Ac flows into the second insert 95*a* disposed inside the second blade air passage 85*a*. The cooling air Ac flowing into the second insert 95*a* performs the impingement cooling on the second passage defining surface 85*p*. Furthermore, the cooling air Ac performs the film cooling on a downstream side portion of the suction side second blade surface portion 54*s*. Therefore, in the present embodiment, the stator vane 50*a* can be more efficiently cooled, and a usage amount of the cooling air Ac can be reduced, compared to when the cooling air Ac flowing into one insert is ejected to the combustion gas passage immediately after the cooling air Ac performs the impingement cooling on the inside of the blade body.

As described above, as in the first embodiment, the second blade air passage may be disposed on the axial downstream side Dad of the first blade air passage 81, or as in the present embodiment, the second blade air passage may be disposed on the circumferential suction side Dcn of the first blade air passage 81*a*.

[First Modification Example of Stator Vane]

Figure 9:
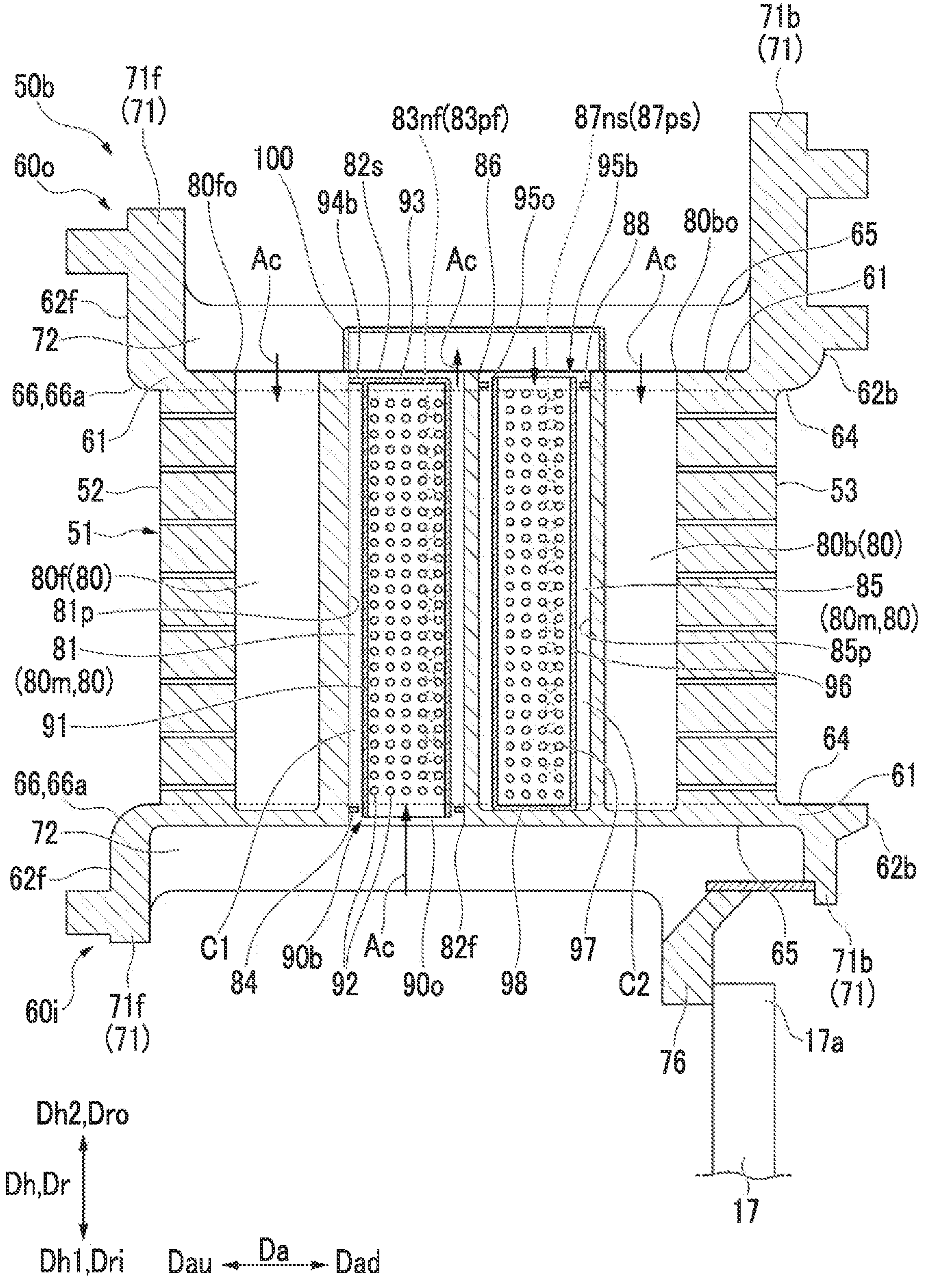
FIG. 9 is a sectional view of a stator vane on a plane including a camber line according to a first modification example of the first embodiment of the present disclosure.

Hereinafter, a first modification example of the first embodiment of the stator vane according to the present invention will be described with reference to FIG. 9.

A stator vane 50*b* of the present modification example is different from the stator vane 50 of the first embodiment in a shape and an attachment method of a first insert 90*b* and a second insert 95*b*, and other configurations are the same.

The first insert 90*b* of the present modification example includes the outer peripheral plate portion 91, the sealing plate portion 93, and a flange portion 94*b*. The outer peripheral plate portion 91 has a tubular shape, and extends in the tube-height direction Dih. The sealing plate portion 93 closes an end of the outer peripheral plate portion 91 on the tube-height sealing side Dih1. Meanwhile, the sealing plate portion is not provided in an end portion of the outer peripheral plate portion 91 on the tube-height opening side Dih2. Therefore, the insert opening 90*o* for introducing the cooling air Ac into the outer peripheral plate portion 91 is formed in the end portion of the outer peripheral plate portion 91 on the tube-height opening side Dih2. Unlike the flange portion 94 of the first insert 90 in the first embodiment, the flange portion 94*b* spreads toward the outer peripheral side from the end on the tube-height sealing side Dih1 in a portion of the outer peripheral surface of the outer peripheral plate portion 91. Therefore, the flange portion 94*b* of the first insert 90*b* has a shape in which a portion is cut out.

The outer peripheral plate portion 91 of the first insert 90*b* is disposed inside the first blade air passage 81 so that the tube-height opening side Dih2 faces the blade-height first side Dh1, and a gap exists between the outer peripheral plate portion 91 and the first passage defining surface 81*p*. An outer edge of the flange portion 94*b* is connected to the vicinity of the second opening 82*s* of the first blade air passage 81. Therefore, unlike the first insert 90 in the first embodiment, in the first insert 90*b* of the present modification example, the tube-height sealing side Dih1 is fixed to the blade body 51. A seal flange 84 protruding toward a center side of the first blade air passage 81 and facing the outer peripheral plate portion 91 of the first insert 90*b* is provided in an edge of the first opening 82*f* of the first blade air passage 81. The seal flange 84 serves to prevent the cooling air Ac flowing into the cavity 72 of the inner shroud 60*i* from flowing into the intra-blade first cavity C1 inside the first blade air passage 81. The seal flange 84 is not fixed to the outer peripheral plate portion 91 of the first insert 90*b* to allow the displacement of the first insert 90*b* in the blade-height direction Dh.

In the outer peripheral plate portion 91 of the first insert 90*b*, a portion facing the pressure side first blade surface portion 55*f* and a portion facing the suction side first blade surface portion 54*f* have the plurality of impingement holes 92 penetrating from the inside to the outside of the outer peripheral plate portion 91, as in the outer peripheral plate portion 91 of the first insert 90 in the first embodiment.

The second insert 95*b* of the present modification example includes the outer peripheral plate portion 96 and the sealing plate portion 98, and does not include the flange portion. The outer peripheral plate portion 96 has a tubular shape, and extends in the tube-height direction Dih. The sealing plate portion 98 closes an end of the outer peripheral plate portion 96 on the tube-height sealing side Dih1. Meanwhile, the sealing plate portion is not provided in an end portion of the outer peripheral plate portion 96 on the tube-height opening side Dih2. Therefore, the insert opening 95*o* for introducing the cooling air Ac into the outer peripheral plate portion 96 is formed in the end portion of the outer peripheral plate portion 96 on the tube-height opening side Dih2.

The outer peripheral plate portion 96 of the second insert 95*b* is disposed inside the second blade air passage 85 so that the tube-height opening side Dih2 faces the blade-height second side Dh2, and a gap exists between the outer peripheral plate portion 96 and the second passage defining surface 85*p*. The sealing plate portion 98 of the second insert 95*b* is fixed to a bottom surface which is a surface of the second blade air passage 85 on the blade-height first side Dh1, on the second passage defining surface 85*p*. Therefore, unlike the second insert 95 in the first embodiment, in the second insert 95*b* of the present modification example, the tube-height sealing side Dih1 is fixed to the blade body 51. A seal flange 88 protruding toward a center side of the second blade air passage 85 and facing the outer peripheral plate portion 96 of the second insert 95*b* is provided in an edge of the opening 86 of the second blade air passage 85. The seal flange 88 serves to prevent the cooling air Ac inside the end cover 100 from flowing into the intra-blade second cavity C2 inside the second blade air passage 85. The seal flange 88 is not fixed to the outer peripheral plate portion 96 of the second insert 95*b* to allow the displacement of the second insert 95*b* in the blade-height direction Dh.

In the outer peripheral plate portion 96 of the second insert 95*b*, a portion facing the pressure side second blade surface portion 55*s* and a portion facing the suction side second blade surface portion 54*s* have the plurality of impingement holes 97 penetrating from the inside to the outside of the outer peripheral plate portion 96, as in the outer peripheral plate portion 96 of the first insert 90 in the first embodiment.

In the present modification example, the cooling air Ac also flows into the cavity 72 of the outer shroud 60*o* from the radial outer side Dro of the outer shroud 60*o*. In addition, the cooling air Ac flows into the cavity 72 of the inner shroud 60*i* from the radial inner side Dri of the inner shroud 60*i*.

As in the first embodiment, a portion of the cooling air Ac flowing into the cavity 72 of the outer shroud 60*o* flows into the front side blade air passage 80*f* from the opening 80*fo* of the front side blade air passage 80*f*. In addition, as in the first embodiment, the other portion of the cooling air Ac flowing into the cavity 72 of the outer shroud 60*o* also flows into the rear side blade air passage 80*b* from the opening 80*bo* of the rear side blade air passage 80*b*.

Most of the cooling air Ac flowing into the cavity 72 of the inner shroud 60*i* flows into the outer peripheral plate portion 91 of the first insert 90*b* from the first opening 82*f* of the first blade air passage 81 and the insert opening 90*o* of the first insert 90*b*. However, a slight amount of the cooling air Ac flowing into the cavity 72 of the inner shroud 60*i* flows into the intra-blade first cavity C1 inside the first blade air passage 81 from a gap between the seal flange 84 provided in an edge of the first opening 82*f* of the first blade air passage 81 and the outer peripheral plate portion 91 of the first insert 90*b*. The cooling air Ac flowing into the outer peripheral plate portion 91 is ejected to the outer peripheral side of the outer peripheral plate portion 91 from the plurality of impingement holes 92 formed in the outer peripheral plate portion 91, and flows into the intra-blade first cavity C1. The cooling air Ac collides with a portion having a back-to-back relationship with the pressure side first blade surface portion 55*f* and a portion having a back-to-back relationship with the suction side first blade surface portion 54*f* on the first passage defining surface 81*p*, and performs impingement cooling on these portions.

A portion of the cooling air Ac flowing into the intra-blade first cavity C1 is ejected into the combustion gas passage 49 from the plurality of pressure side first ejection holes 83*pf* and the plurality of suction side first ejection holes 83*nf*. The remaining portion of the cooling air Ac flowing into the intra-blade first cavity C1 flows inside the intra-blade first cavity C1 toward the radial outer side Dro which is the blade-height second side Dh2, and flows into the end cover 100 through a cutout portion of the flange portion 94*b* of the first insert 90*b* and the second opening 82*s* of the first blade air passage 81.

Most of the cooling air Ac flowing into the end cover 100 flow into the outer peripheral plate portion 96 of the second insert 95*b* from the opening 86 of the second blade air passage 85 and the insert opening 95*o* of the second insert 95*b*. However, a slight amount of the cooling air Ac flowing into the end cover 100 flows into the intra-blade second cavity C2 inside the second blade air passage 85 from a gap between the seal flange 88 provided in an edge of the opening 86 of the second blade air passage 85 and the outer peripheral plate portion 96 of the second insert 95*b*. The cooling air Ac flowing into the outer peripheral plate portion 96 is ejected to the outer peripheral side of the outer peripheral plate portion 96 from the plurality of impingement holes 97 formed in the outer peripheral plate portion 96, and flows into the intra-blade second cavity C2. The cooling air Ac collides with a portion having a back-to-back relationship with the pressure side second blade surface portion 55*s* and a portion having a back-to-back relationship with the suction side second blade surface portion 54*s* on the second passage defining surface 85*p*, and performs the impingement cooling on these portions.

The cooling air Ac flowing into the intra-blade second cavity C2 is ejected into the combustion gas passage 49 from the plurality of pressure side second ejection holes 87*ps* and the plurality of suction side second ejection holes 87*ns*.

In the present modification example, as in the first embodiment, the cooling air Ac flowing into the first insert 90*b* disposed inside the first blade air passage 81 also performs the impingement cooling on the first passage defining surface 81*p*. Furthermore, a portion of the cooling air Ac flows into the second insert 95*b* to perform the impingement cooling on the second passage defining surface 85*p*. Therefore, in the present modification example, as in the first embodiment, the stator vane 50*b* can be more efficiently cooled, and a usage amount of the cooling air Ac can be reduced, compared to when the cooling air Ac flowing into one insert is ejected to the combustion gas passage immediately after the cooling air Ac performs the impingement cooling on the inside of the blade body.

However, in the present modification example, without performing the impingement cooling on the first passage defining surface 81*p*, as described above, a portion of the cooling air Ac flowing into the cavity 72 of the inner shroud 60*i* flows into the intra-blade first cavity C1 from the gap between the seal flange 84 provided in the edge of the first opening 82*f* of the first blade air passage 81 and the outer peripheral plate portion 91 of the first insert 90*b*. In addition, in the present modification example, without performing the impingement cooling on the second passage defining surface 85*p*, as described above, a portion of the cooling air Ac flowing into the end cover 100 flows into the intra-blade second cavity C2 from the gap between the seal flange 88 provided in the edge of the opening 86 of the second blade air passage 85 and the outer peripheral plate portion 96 of the second insert 95*b*. Therefore, in the present modification example, an impingement cooling effect of the blade body 51 is lower than that in the first embodiment. In other words, the impingement cooling effect of the blade body 51 of the first embodiment is higher than that in the present modification example.

As described above, as in the first embodiment, in the first insert 90*b* and the second insert 95*b*, the tube-height opening side Dih2 may be fixed to the blade body 51, or as in the present modification example, the tube-height sealing side Dih1 may be fixed to the blade body 51.

Although the present modification example is a modification example of the first embodiment, the second embodiment may be configured in the same manner as the present modification example.

[Second Modification Example of Stator Vane]

Figure 10:
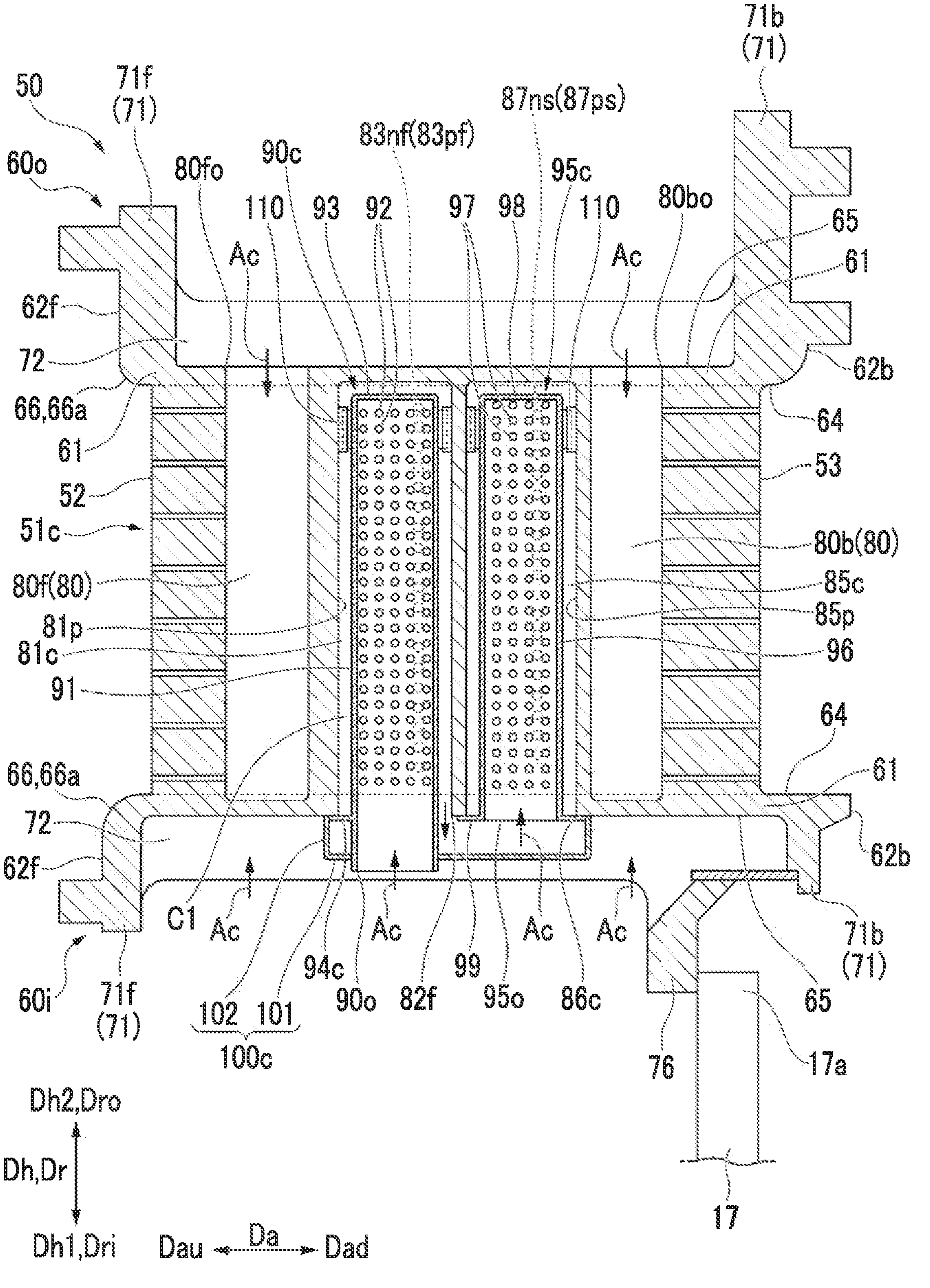
FIG. 10 is a sectional view of a stator vane on a plane including a camber line according to a second modification example of the first embodiment of the present disclosure.

Hereinafter, a second modification example of the first embodiment of the stator vane according to the present invention will be described with reference to FIG. 10.

A stator vane 50*c* of the present modification example is different from the stator vane 50 of the first embodiment in that an opening of a first blade air passage 81*c*, an opening of a second blade air passage 85*c*, and an end cover 100*c* are disposed to be different. In addition, the stator vane 50*c* of the present modification example is different from the stator vane 50 of the first embodiment in that a shape and an attachment method of a first insert 90*c* and an attachment method of a second insert 95*c* are different, and other configurations are the same.

Both the first blade air passage 81*c* and the second blade air passage 85*c* of the present modification example extend in the blade-height direction Dh, as in the first embodiment. However, in the first blade air passage 81*c* of the present modification example, an end on the radial inner side Dri which is the blade-height first side Dh1 is open, and an end on the radial outer side Dro which is the blade-height second side Dh2 is closed. The opening 82*f* on the radial inner side Dri of the first blade air passage 81*c* is open on the counter-gas path surface 65 of the inner shroud 60*i*. In addition, in the second blade air passage 85*c*, an end on the radial inner side Dri which is the blade-height first side Dh1 is open, and an end on the radial outer side Dro which is the blade-height second side Dh2 is closed. An opening 86*c* of the second blade air passage 85*c* is open on the counter-gas path surface 65 of the inner shroud 60*i*.

As described above, in the present modification example, in both the first blade air passage 81*c* and the second blade air passage 85*c*, the end on the radial inner side Dri which is the blade-height first side Dh1 is open.

The first insert 90*c* of the present modification example includes the outer peripheral plate portion 91, the sealing plate portion 93, and a flange portion 94*c*. The outer peripheral plate portion 91 has a tubular shape, and extends in the tube-height direction Dih. The sealing plate portion 93 closes an end of the outer peripheral plate portion 91 on the tube-height sealing side Dih1. Meanwhile, the sealing plate portion is not provided in an end portion of the outer peripheral plate portion 91 on the tube-height opening side Dih2. Therefore, the insert opening 90*o* for introducing the cooling air Ac into the outer peripheral plate portion 91 is formed in the end portion of the outer peripheral plate portion 91 on the tube-height opening side Dih2. Unlike the flange portion 94 of the first insert 90 in the first embodiment, the flange portion 94*c* is a portion of the outer peripheral surface of the outer peripheral plate portion 91, and spreads toward the outer peripheral side from a position separated by a predetermined distance to the tube-height sealing side Dih1 from the end of the tube-height opening side Dih2 of the outer peripheral plate portion 91. Therefore, the flange portion 94*c* of the first insert 90*c* has a shape in which a portion is cut out. The predetermined distance is greater than the height of the outer peripheral plate portion 103 of the end cover 100.

The outer peripheral plate portion 91 of the first insert 90*c* is disposed inside the first blade air passage 81*c* so that the tube-height opening side Dih2 faces the blade-height first side Dh1, and a gap exists between the outer peripheral plate portion 91 and the first passage defining surface 81*p*. The flange portion 94*c* is connected to the edge of the first opening 82*f* of the first blade air passage 81*c*.

As in the second insert 95 of the first embodiment, the second insert 95*c* of the present modification example includes the outer peripheral plate portion 96, the sealing plate portion 98, and the flange portion 99. However, unlike the first embodiment, the outer peripheral plate portion 96 of the second insert 95*c* of the present modification example is disposed inside the second blade air passage 85*c* so that the tube-height opening side Dih2 faces the blade-height first side Dh1, and a gap exists between the outer peripheral plate portion 91 and the second passage defining surface 85*p* of the blade body 51 defining the second blade air passage 85*c*. The flange portion 99 is connected to the edge of the opening 86*c* of the second blade air passage 85*c* to close the gap between the outer peripheral plate portion 96 and the second passage defining surface 85*p*.

As in the end cover 100 of the first embodiment, the end cover 100*c* includes the top plate portion 101 and the outer peripheral plate portion 102. However, the end cover 100*c* of the present modification example is disposed on the blade-height first side Dh1 of the blade body 51. The top plate portion 101 of the end cover 100*c* faces a region where the first blade air passage 81*c* and the second blade air passage 85*c* are disposed, at an interval in the blade-height direction Dh, on the counter-gas path surface 65 of the inner shroud 60*i*. The outer peripheral plate portion 102 of the end cover 100*c* is connected to an edge of the region where the first blade air passage 81*c* and the second blade air passage 85*c* exist, on the counter-gas path surface 65 of the inner shroud 60*i*. The tube-height opening side Dih2 of the outer peripheral plate portion 91 of the first insert 90*c* protrudes to the radial inner side Dri from the top plate portion 101 of the end cover 100*c*.

In the present modification example, the cooling air Ac also flows into the cavity 72 of the outer shroud 60*o* from the radial outer side Dro of the outer shroud 60*o*. In addition, the cooling air Ac flows into the cavity 72 of the inner shroud 60*i* from the radial inner side Dri of the inner shroud 60*i*.

As in the first embodiment, a portion of the cooling air Ac flowing into the cavity 72 of the outer shroud 60*o* flows into the front side blade air passage 80*f* from the opening 80*fo* of the front side blade air passage 80*f*. In addition, as in the first embodiment, the other portion of the cooling air Ac flowing into the cavity 72 of the outer shroud 60*o* also flows into the rear side blade air passage 80*b* from the opening 80*bo* of the rear side blade air passage 80*b*.

The cooling air Ac flowing into the cavity 72 of the inner shroud 60*i* flows into the outer peripheral plate portion 91 of the first insert 90*c* from the insert opening 90*o* of the first insert 90*c*. The cooling air Ac flowing into the outer peripheral plate portion 91 is ejected to the outer peripheral side of the outer peripheral plate portion 91 from the plurality of impingement holes 92 formed in the outer peripheral plate portion 91, and flows into the intra-blade first cavity C1. The cooling air Ac collides with the first passage defining surface 81*p*, and performs the impingement cooling on the first passage defining surface 81*p*.

A portion of the cooling air Ac flowing into the intra-blade first cavity C1 is ejected into the combustion gas passage 49 from the plurality of pressure side first ejection holes 83*pf* and the plurality of suction side first ejection holes 83*nf*. The remaining portion of the cooling air Ac flowing into the intra-blade first cavity C1 flows inside the intra-blade first cavity C1 toward the radial inner side Dri which is the blade-height first side Dh1, and flows into the end cover 100*c* through the cutout portion of the flange portion 94*c* of the first insert 90*c* and the opening 82*f* of the first blade air passage 81*c*.

The cooling air Ac flowing into the end cover 100*c* flows into the outer peripheral plate portion 96 of the second insert 95*c* from the opening 86*c* of the second blade air passage 85*c* and the insert opening 95*o* of the second insert 95*c*. The cooling air Ac flowing into the outer peripheral plate portion 96 is ejected to the outer peripheral side of the outer peripheral plate portion 96 from the plurality of impingement holes 97 formed in the outer peripheral plate portion 96, and flows into the intra-blade second cavity C2. The cooling air Ac collides with the second passage defining surface 85*p*, and performs the impingement cooling on the second passage defining surface 85*p*.

The cooling air Ac flowing into the intra-blade second cavity C2 is ejected into the combustion gas passage 49 from the plurality of pressure side second ejection holes 87*ps* and the plurality of suction side second ejection holes 87*ns*.

In the present modification example, as in the first embodiment, the cooling air Ac flowing into the first insert 90*c* disposed inside the first blade air passage 81*c* also performs the impingement cooling on the first passage defining surface 81*p*. Furthermore, a portion of the cooling air Ac flows into the second insert 95*c*, and performs the impingement cooling on the second passage defining surface 85*p*. Therefore, in the present modification example, as in the first embodiment, the stator vane 50*c* can be more efficiently cooled, and a usage amount of the cooling air Ac can be reduced, compared to when the cooling air Ac flowing into one insert is ejected to the combustion gas passage immediately after the cooling air Ac performs the impingement cooling on the inside of the blade body.

However, in the present modification example, the cooling air Ac flowing into the first insert 90*c* flows to the blade-height second side Dh2 inside the first insert 90*c*, and is ejected from the impingement hole 92. Thereafter, the cooling air Ac flows toward the blade-height first side Dh1 inside the intra-blade first cavity C1, and flows into the second insert 95*c*. Therefore, in the present modification example, the cooling air Ac reciprocates in the blade-height direction Dh inside the first blade air passage 81*c*. Therefore, a flow path length through which the cooling air Ac flows is lengthened, and flow resistance of the cooling air Ac increases. As a result, in the present modification example, the pressure of the cooling air Ac flowing into the second insert 95*c* decreases. Therefore, in the present modification example, the impingement cooling effect of the blade body 51*c* is lower than that in the first embodiment. In other words, the impingement cooling effect of the blade body 51 of the first embodiment is higher than that in the present modification example.

As described above, out of the blade-height first side Dh1 and the blade-height second side Dh2, a side on which both the first blade air passage and the second blade air passage are open may be the blade-height second side Dh2 as in the first embodiment, or may be the blade-height first side Dh1 as in the present modification example. In addition, the tube-height opening side Dih of the second insert may face the blade-height second side Dh2 as in the first embodiment, or may face the blade-height first side Dh1 as in the present modification example.

Although the present modification example is a modification example of the first embodiment, the second embodiment may be configured in the same manner as the present modification example.

[Third Modification Example of Stator Vane]

Figure 11:
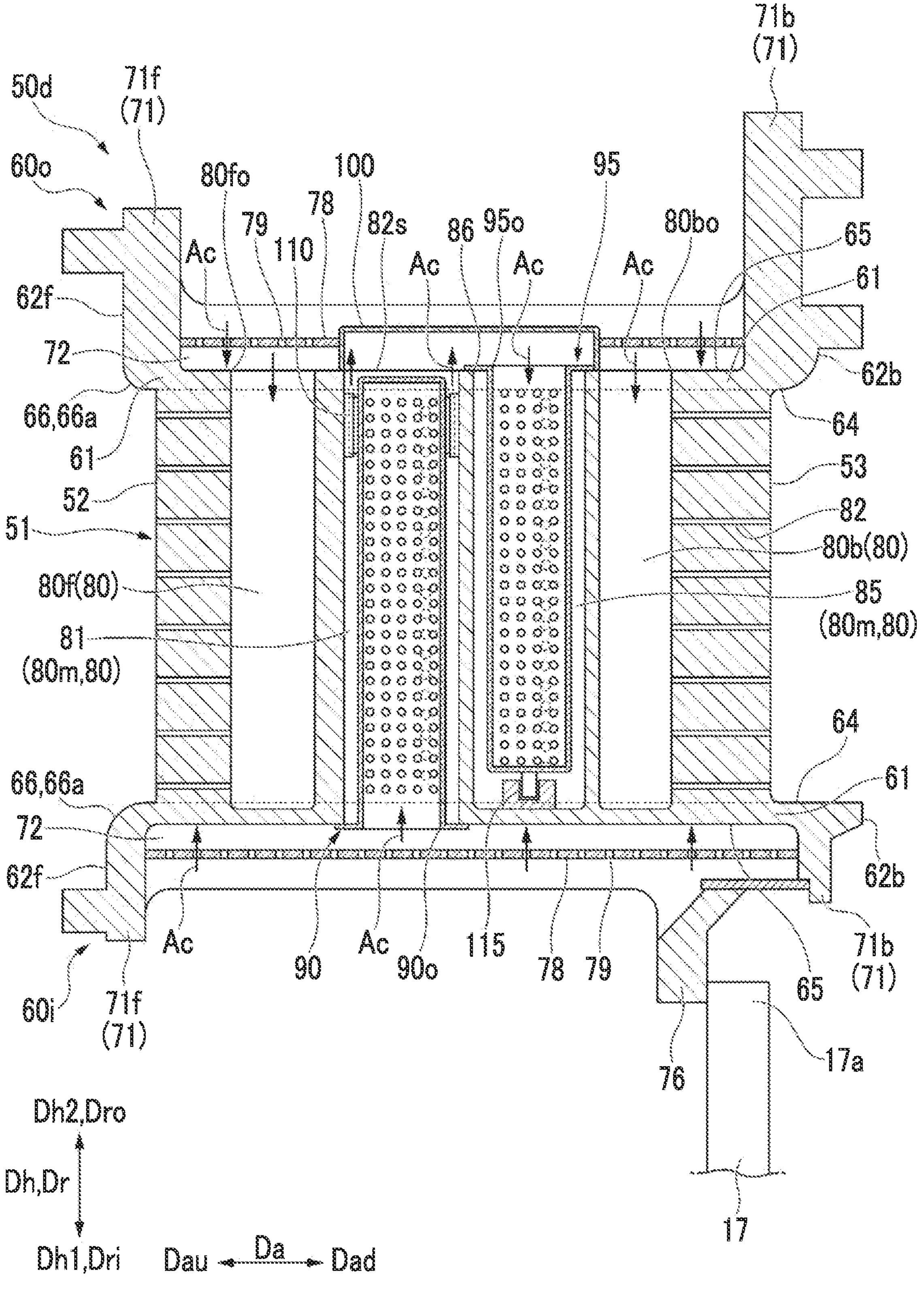
FIG. 11 is a sectional view of a stator vane on a plane including a camber line according to a third modification example of the first embodiment of the present disclosure.

Hereinafter, a third modification example of the first embodiment of the stator vane according to the present invention will be described with reference to FIG. 11.

A stator vane 50*d* of the present modification example is a stator vane in which an impingement plate 78 is added to each of the inside of the outer shroud 60*o* and the inside of the inner shroud 60*i* in the stator vane 50 of the first embodiment.

The impingement plate 78 inside the outer shroud 60*o* partitions the cavity 72 of the outer shroud 60*o* into two spaces in the blade-height direction Dh. The impingement plate 78 has a plurality of impingement holes 79 penetrating in the blade-height direction Dh.

The impingement plate 78 inside the inner shroud 60*i* partitions the cavity 72 of the inner shroud 60*i* into two spaces in the blade-height direction Dh. The impingement plate 78 has a plurality of impingement holes 79 penetrating in the blade-height direction Dh.

The cooling air Ac flowing into the cavity 72 of the outer shroud 60*o* is ejected from the plurality of impingement holes 79 of the impingement plate 78, collides with the counter-gas path surface 65 of the outer shroud 60*o*, and performs the impingement cooling on the counter-gas path surface 65. As in the first embodiment, a portion of the cooling air Ac performing the impingement cooling on the counter-gas path surface 65 flows into the front side blade air passage 80*f* from the opening 80*fo* of the front side blade air passage 80*f*. In addition, as in the first embodiment, the other portion of the cooling air Ac performing the impingement cooling on the counter-gas path surface 65 flows into the rear side blade air passage 80*b* from the opening 80*bo* of the rear side blade air passage 80*b*.

The cooling air Ac flowing into the cavity 72 of the inner shroud 60*i* is ejected from the plurality of impingement holes 79 of the impingement plate 78, collides with the counter-gas path surface 65 of the inner shroud 60*i*, and performs the impingement cooling on the counter-gas path surface 65. As in the first embodiment, a portion of the cooling air Ac performing the impingement cooling on the counter-gas path surface 65 flows into the first insert 90. As in the first embodiment, the cooling air Ac flowing into the first insert 90 performs the impingement cooling on the first passage defining surface 81*p*, and thereafter, performs the impingement cooling on the second passage defining surface 85*p*.

As described above, in the present modification example, the cooling air Ac flowing into the cavity 72 of the inner shroud 60*i* can perform the impingement cooling three times on the inside of the stator vane 50*d*. Therefore, in the present modification example, the stator vane 50*d* can be more efficiently cooled, and a usage amount of the cooling air Ac can be reduced, compared to the first embodiment and each modification example thereof.

Although the present modification example is a modification example of the first embodiment, as in the present modification example, the impingement plate 78 may be added to the second embodiment, the first modification example, and the second modification example.

[Other Modification Examples of Stator Vane]

In each of the above-described embodiments and modification examples, the blade-height first side Dh1 is the radial inner side Dri, and the blade-height second side Dh2 is the radial outer side Dro. However, the blade-height first side Dh1 may be the radial outer side Dro, and the blade-height second side Dh2 may be the radial inner side Dri.

The stator vane of each of the above-described embodiments and modification examples includes two blade air passages as the intermediate blade air passages 80*m*, one of which is the first blade air passage, and the other of which is the second blade air passage. However, the stator vane may include three or more blade air passages as the intermediate blade air passages 80*m*, one of which may be used as the first blade air passage, and another one of which may be used as the second blade air passage. In addition, both the first blade air passage and the second blade air passage do not need to be passages between the front side blade air passage 80*f* and the rear side blade air passage 80*b*. For example, the first blade air passage may be one of the intermediate blade air passages 80*m*, and the second blade air passage may be the rear side blade air passage 80*b*.

All of the stator vanes of each of the above-described embodiments and modification examples are the stator vanes forming the first-stage stator vane row 46. However, the stator vane may be a stator vane forming a stator vane row closer to the axial downstream side Dad than the first-stage stator vane row 46 is.

The embodiments and modification examples of the present disclosure have been described in detail above. However, the present disclosure is not limited to the above-described embodiments and modification examples. Various additions, changes, replacements, or partial deletions can be made within the scope that does not deviate from the conceptual idea and the gist of the present disclosure derived from the contents defined in the scope of the appended claims and the equivalent thereof.

[Additional Notes]

For example, the stator vane in the above-described embodiment and modification example is understood as follows.

(1) According to a first aspect, there is provided the stator vane provided in the gas turbine 10. The stator vane includes the blade bodies 51, 51*a*, and 51*c* having a blade shape in a cross section and extending in the blade-height direction Dh having a direction component perpendicular to the cross section, the first inserts 90, 90*a*, 90*b*, and 90*c* and the second inserts 95, 95*a*, 95*b*, and 95*c* which have a tubular shape, extend in the tube-height direction Dih, and are disposed inside the blade bodies 51, 51*a*, and 51*c* so that the tube-height direction Dih faces the blade-height direction Dh, and the end covers 100, 100*a*, and 100*c*. The blade bodies 51, 51*a*, and 51*c* include the plurality of blade air passages 80 extending in the blade-height direction Dh inside the blade bodies 51, 51*a*, and 51*c*. In the plurality of blade air passages 80, both the first blade air passages 81, 81*a*, and 81*c* and the second blade air passages 85, 85*a*, and 85*c* have an open end on the blade-height one side which is one side of the blade-height first side Dh1 and the blade-height second side Dh2 in the blade-height direction Dh. Both the first inserts 90, 90*a*, 90*b*, and 90*c* and the second inserts 95, 95*a*, 95*b*, and 95*c* include the outer peripheral plate portions 91 and 96 having a tubular shape and extending in the tube-height direction Dih, and the sealing plate portions 93 and 98 that close the ends on the tube-height sealing side Dih1 which is one side of the outer peripheral plate portions 91 and 96 in the tube-height direction Dih out of two sides in the tube-height direction Dih. The outer peripheral plate portions 91 and 96 have the plurality of impingement holes 92 and 97 penetrating from the inside to the outside of the tubular outer peripheral plate portions 91 and 96. The tube-height opening side Dih2 which is the other side of the outer peripheral plate portions 91 and 96 in the tube-height direction Dih is open. The outer peripheral plate portion 91 of the first inserts 90, 90*a*, 90*b*, and 90*c* has a gap existing between the outer peripheral plate portion 91 of the first insert 90 and the first passage defining surface 81*p* of the blade bodies 51, 51*a*, and 51*c* defining the first blade air passage 81, and is disposed inside the first blade air passage 81, 81*a*, and 81*c* so that cooling air Ac flows into the outer peripheral plate portion 91 from the opening of the first inserts 90, 90*a*, 90*b*, and 90*c*. The outer peripheral plate portion 96 of the second inserts 95, 95*a*, 95*b*, and 95*c* is configured so that the tube-height opening side Dih2 of the second inserts 95, 95*a*, 95*b*, and 95*c* faces the blade-height one side, has a gap existing between the outer peripheral plate portion 96 of the second inserts 95, 95*a*, 95*b*, and 95*c* and the second passage defining surface 85*p* of the blade bodies 51, 51*a*, and 51*c* defining the second blade air passage 85, and is disposed inside the second blade air passages 85, 85*a*, and 85*c* so that the cooling air Ac flows from the opening of the second inserts 95, 95*a*, 95*b*, and 95*c*. The end covers 100, 100*a*, and 100*c* are provided on the blade-height one side of the blade body 51 so that the cooling air Ac ejected from the plurality of impingement holes 92 of the first inserts 90, 90*a*, 90*b*, and 90*c* to between the outer peripheral plate portion 91 of the first inserts 90, 90*a*, 90*b*, and 90*c* and the first passage defining surface 81*p* is guided into the second inserts 95, 95*a*, 95*b*, and 95*c* from the opening of the second inserts 95, 95*a*, 95*b*, and 95*c* through the opening of the first blade air passage 81, and cover the opening of the first blade air passage 81 and the opening of the second inserts 95, 95*a*, 95*b*, and 95*c*.

In the present aspect, the cooling air Ac flowing into the first inserts 90, 90*a*, 90*b*, and 90*c* disposed inside the first blade air passages 81, 81*a*, and 81*c* performs the impingement cooling on the first passage defining surface 81*p*. Furthermore, at least a portion of the cooling air Ac flows into the second inserts 95, 95*a*, 95*b*, and 95*c* disposed inside the second blade air passages 85, 85*a*, and 85*c*. The cooling air Ac flowing into the second inserts 95, 95*a*, 95*b*, and 95*c* performs the impingement cooling on the second passage defining surface 85*p*. Therefore, in the present aspect, the stator vane can be more efficiently cooled, and a usage amount of the cooling air Ac can be reduced, compared to when the cooling air Ac flowing into one insert is ejected to the combustion gas passage immediately after the cooling air Ac performs the impingement cooling on the inside of the blade body.

(2) According to a second aspect of the stator vane, in the stator vane according to the first aspect, the blade surfaces which are the outer surfaces of the blade bodies 51, 51*a*, and 51*c* include the first blade surface portions 54*f* and 55*f* having a back-to-back positional relationship with the first passage defining surface 81*p*, and the second blade surface portions 54*s* and 55*s* having a back-to-back positional relationship with the second passage defining surface 85*p*. The plurality of impingement holes 92 are formed in portions facing the first blade surface portions 54*f* and 55*f* in the outer peripheral plate portion 91 in the first inserts 90, 90*a*, 90*b*, and 90*c*. The plurality of impingement holes 97 are formed in portions facing the second blade surface portions 54*s* and 55*s* in the outer peripheral plate portion 96 of the second inserts 95, 95*a*, 95*b*, and 95*c*.

In the present aspect, the blade surface exposed to the combustion gas can be effectively cooled.

(3) According to a third aspect of the stator vane, in the stator vane according to the second aspect, the blade bodies 51, 51*a* and 51*c* have the plurality of ejection holes 87*ns* and 87*ps* penetrating from the second passage defining surface 85*p* to the second blade surface portions 54*s* and 55*s*. The positions of the second blade surface portions 54*s* and 55*s* on the blade surface are positions where the pressure of the portion along the second blade surface portions 54*s* and 55*s* outside the blade bodies 51, 51*a*, and 51*c* while the gas turbine 10 is driven is lower than the pressure of the portion along the first blade surface portions 54*f* and 55*f* outside the blade bodies 51, 51*a*, and 51*c*.

(4) According to a fourth aspect of the stator vane, in the stator vane according to the third aspect, the blade bodies 51 and 51*c* include the leading edge 52 extending in the blade-height direction Dh, the trailing edge 53 extending in the blade-height direction Dh, and the pressure surface 55 and the suction surface 54 which extend in the blade-height direction Dh and connect the leading edge 52 and the trailing edge 53. The first blade surface portions 54*f* and 55*f* are portions of one blade surface of the pressure surface 55 and the suction surface 54. The second blade surface portions 54*s* and 55*s* are located closer to a side of the trailing edge 53 than the first blade surface portions 54*f* and 55*f* are in the one blade surface.

(5) According to a fifth aspect of the stator vane, in the stator vane according to the third aspect, the blade body 51*a* includes the leading edge 52 extending in the blade-height direction Dh, the trailing edge 53 extending in the blade-height direction Dh, and the pressure surface 55 and the suction surface 54 which extend in the blade-height direction Dh and connect the leading edge 52 and the trailing edge 53. The first blade surface portion 55*f* is a portion of the pressure surface 55. The second blade surface portion 54*s* is a portion of the suction surface 54.

(6) According to a sixth aspect of the stator vane, in the stator vane according to any one aspect of the first aspect to the fifth aspect, in the first blade air passages 81 and 81*a*, an end on the blade-height first side Dh1 and an end on the blade-height second side Dh2 of the first blade air passages 81 and 81*a* are open. In the second blade air passages 85 and 85*a*, an end on the blade-height first side Dh1 of the second blade air passages 85 and 85*a* is closed, and an end on the blade-height second side Dh2 is open. The first inserts 90 and 90*a* include the flange portion 94 spreading from an end on the tube-height opening side Dih2 in the outer peripheral plate portion 91 of the first inserts 90 and 90*a* toward the outer peripheral side of the outer peripheral plate portion 91 of the first inserts 90 and 90*a*, extending to the first passage defining surface 81*p*, and connected to the blade body 51.

The second inserts 95 and 95*a* include the flange portion 99 spreading from an end on the tube-height opening side Dih2 in the outer peripheral plate portion 96 of the second inserts 95 and 95*a* toward the outer peripheral side of the outer peripheral plate portion 96 of the second inserts 95 and 95*a*, extending to the second passage defining surface 85*p*, and connected to the blade body 51. The outer peripheral plate portion 91 of the first inserts 90 and 90*a* is disposed inside the first blade air passages 81 and 81*a* so that the tube-height opening side Dih2 of the first inserts 90 and 90*a* faces the blade-height first side Dh1. The outer peripheral plate portion 96 of the second inserts 95 and 95*a* is disposed inside the second blade air passages 85 and 85*a* so that the tube-height opening side Dih2 of the second inserts 95 and 95*a* faces the blade-height second side Dh2.

In the present aspect, a structure of each insert is not complicated, and the impingement cooling effect of the blade body 51 can be improved.

(7) According to a seventh aspect of the stator vane, the stator vane according to any one aspect of the first aspect to the sixth aspect further includes the first guide member 110 that allows the displacement of the first inserts 90, 90*a*, 90*b*, and 90*c* in the tube-height direction Dih and that regulates the displacement of the first inserts 90, 90*a*, 90*b*, and 90*c* in a spreading direction of the cross section of the first inserts 90, 90*a*, 90*b*, and 90*c*, inside the first blade air passages 81, 81*a*, and 81*c*, and the second guide member 115 that allows the displacement of the second inserts 95, 95*a*, 95*b*, and 95*c* in the tube-height direction Dih and that regulates the displacement of the second inserts 95, 95*a*, 95*b*, and 95*c* in a spreading direction of the cross section of the second inserts 95, 95*a*, 95*b*, and 95*c*, inside the second blade air passages 85, 85*a*, and 85*c*.

In the present aspect, even when the gas turbine 10 is driven so that there is a difference in thermal deformation amounts between the outer peripheral plate portions 91 of the first inserts 90, 90*a*, 90*b*, and 90*c* and the first passage defining surface 81*p* due to a temperature difference therebetween, a distance between the outer peripheral plate portions 91 of the first inserts 90, 90*a*, 90*b*, and 90*c* and the first passage defining surface 81*p* can be kept substantially constant, and a desired impingement cooling effect can be obtained. In addition, in the present aspect, even when the gas turbine 10 is driven so that there is a difference in thermal deformation amounts between the outer peripheral plate portions 96 of the second inserts 95, 95*a*, 95*b*, and 95*c* and the second passage defining surface 85*p* due to a temperature difference therebetween, a distance between the outer peripheral plate portions 96 of the second inserts 95, 95*a*, 95*b*, and 95*c* and the second passage defining surface 85*p* can be kept substantially constant, and a desired impingement cooling effect can be obtained.

(8) According to an eighth aspect of the stator vane, in the stator vane according to the seventh aspect, the first guide member 110 includes the first groove member 111 having the first groove 112 extending in the tube-height direction Dih, and the first convex member 113 entering the inside of the first groove 112 and being relatively movable in the tube-height direction Dih with respect to the first groove 112. One member of the first groove member 111 and the first convex member 113 is fixed to the first inserts 90 and 90*a*, and the other member is fixed to the first passage defining surface 81*p*. The second guide member 115 includes the second groove member 116 having the second groove 117 extending in the tube-height direction Dih, and the second convex member 118 entering the second groove 117 and being relatively movable in the tube-height direction Dih with respect to the second groove 117. One member of the second groove member 116 and the second convex member 118 is fixed to the second inserts 95 and 95*a*, and the other member is fixed to the second passage defining surface 85*p*.

(9) According to a ninth aspect of the stator vane, the stator vane according to the sixth aspect further includes the first guide member 110 that allows the displacement of the first inserts 90 and 90*a* in the tube-height direction Dih and that regulates the displacement of the first inserts 90 and 90*a* in a spreading direction of the cross section of the first inserts 90 and 90*a*, inside the first blade air passages 81 and 81*a*, and the second guide member 115 that allows the displacement of the second inserts 95 and 95*a* in the tube-height direction Dih and that regulates the displacement of the second inserts 95 and 95*a* in a spreading direction of the cross section of the second inserts 95 and 95*a*, inside the second blade air passages 85 and 85*a*. The first guide member 110 includes the first groove member 111 having the first groove 112 extending in the tube-height direction Dih, and the first convex member 113 entering the inside of the first groove 112 and being relatively movable in the tube-height direction Dih with respect to the first groove 112. One member of the first groove member 111 and the first convex member 113 is fixed to the outer peripheral plate portion 91 of the first inserts 90 and 90*a*, and the other member is fixed to the first passage defining surface 81*p* of the blade bodies 51 and 51*a*. The second guide member 115 includes the second groove member 116 having the second groove 117 extending in the tube-height direction Dih, and the second convex member 118 entering the second groove 117 and being relatively movable in the tube-height direction Dih with respect to the second groove 117. One member of the second groove member 116 and the second convex member 118 is fixed to the sealing plate portion 98 of the second inserts 95 and 95*a*, and the other member is fixed to a portion closed in an end on the blade-height first side Dh1 in the second blade air passages 85 and 85*a* in the blade bodies 51 and 51*a*.

(10) According to a tenth aspect of the stator vane, the stator vane according to any one aspect from the first aspect to the ninth aspect further includes the first shroud 60*i* provided in an end on the blade-height first side Dh1 in the blade bodies 51, 51*a*, and 51*c*, the second shroud 60*o* provided in an end on the blade-height second side Dh2 in the blade bodies 51, 51*a*, and 51*c*, and the impingement plate 78 having the plurality of impingement holes 79. The first shroud 60*i* includes the shroud body 61 having the gas path surface 64 facing the blade-height second side Dh2, and the counter-gas path surface 65 facing a side opposite to the gas path surface 64, and the peripheral wall 71 provided along the peripheral edge of the shroud body 61 and protruding from the counter-gas path surface 65 to the blade-height first side Dh1. The impingement plate 78 is formed of the shroud body 61 and the peripheral wall 71, and is fixed to the first shroud 60*i* so that the cavity 72 inside the concave portion recessed toward the blade-height second side Dh2 is partitioned into a space on the blade-height first side Dh1 and a space on the blade-height second side Dh2, and the plurality of impingement holes 79 of the impingement plate 78 extend in the blade-height direction Dh.

In the present aspect, the cooling air Ac flowing into the stator vane can perform the impingement cooling three times on the inside of the stator vane. Therefore, in the present aspect, the stator vane can be efficiently cooled, and a usage amount of the cooling air Ac can be reduced.

For example, the gas turbine in the above-described embodiment is understood as follows.

(11) According to an eleventh aspect, there is provided the gas turbine including the stator vane according to any one aspect of the first aspect to the tenth aspect, the rotor 41 that rotates around the axis Ar, and the casing 45 that covers the outer peripheral side of the rotor 41. The stator vane is fixed to the inner peripheral surface of the casing 45.

INDUSTRIAL APPLICABILITY

According to an aspect of the present disclosure, a stator vane can be effectively cooled, and a usage amount of cooling air can be minimized while durability is improved.

REFERENCE SIGNS LIST

10: Gas turbine
11: Gas turbine rotor
15: Gas turbine casing
16: Intermediate casing
20: Compressor
21: Compressor rotor
22: Rotor shaft
23: Rotor blade row
23*a*: Rotor blade
25: Compressor casing
26: Stator vane row
26*a*: Stator vane
30: Combustor
40: Turbine
41: Turbine rotor
42: Rotor shaft
43: Rotor blade row
43*a*: Rotor blade
45: Turbine casing
45*a*: Outer casing
45*b*: Inner casing
45*c*: Ring segment
46: Stator vane row
46*a*: Stator vane
49: Combustion gas passage
50, 50*a*, 50*b*, 50*c*, 50*d*: Stator vane
51, 51*a*, 51*c*: Blade body
52: Leading edge
53: Trailing edge
54: Suction surface
54*f*: Suction side first blade surface portion
54*s*: Suction side second blade surface portion
55: Pressure surface
55*f*: Pressure side first blade surface portion
55*s*: Pressure side second blade surface portion
60*o*: Outer shroud
60*i*: Inner shroud
61: Shroud body
62*f*: Front end surface
62*b*: Rear end surface
63*n*: Suction side end surface
63*p*: Pressure side end surface
64: Gas path surface
65: Counter-gas path surface
71: Peripheral wall
71*f*: Front peripheral wall
71*b*: Rear peripheral wall
71*n*: Suction side peripheral wall
71*p*: Pressure side peripheral wall
72: Cavity
76: Retainer
78: Impingement plate
79: Impingement hole
80: Blade air passage
80*f*: Front side blade air passage
80*fa*: Front side ejection hole
80*fo*: Opening
80*b*: Rear side blade air passage
80*ba*: Rear side ejection hole
80*bo*: Opening
80*m*: Intermediate blade air passage
81, 81*a*, 81*c*: First blade air passage
81*p*: First passage defining surface
82*f*: First opening (or simply opening)
82*s*: Second opening
83*nf*: Suction side first ejection hole
83*pf*: Pressure side first ejection hole
84: Seal flange
85, 85*a*, 85*c*: Second blade air passage
85*p*: Second passage defining surface
86, 86*c*: Opening
87*ns*: Suction side second ejection hole
87*ps*: Pressure side second ejection hole
88: Seal flange
90, 90*a*, 90*b*, 90*c*: First insert
90*o*: Insert opening
91: Outer peripheral plate portion
92: Impingement hole
93: Sealing plate portion
94, 94*b*, 94*c*: Flange portion
95, 95*a*, 95*b*, 95*c*: Second insert
95*o*: Insert opening
96: Outer peripheral plate portion
97: Impingement hole
98: Sealing plate portion
99: Flange portion
100, 100*a*, 100*c*: End cover
101, 101*a*: Top plate portion
102: Outer peripheral plate portion
110: First guide member
111: First groove member
112: First groove
113: First convex member
115: Second guide member
116: Second groove member
117: Second groove
118: Second convex member
A: Air
Ac: Cooling air
F: Fuel
G: Combustion gas
Ar: Axis
CL: Camber line
C1: Intra-blade first cavity
C2: Intra-blade second cavity
Da: Axial direction
Dau: Axial upstream side
Dad: Axial downstream side
Dc: Circumferential direction
Dcp: Circumferential pressure side
Dcn: Circumferential suction side
Dr: Radial direction
Dri: Radial inner side
Dro: Radial outer side Dh: Blade-height direction
Dh1: Blade-height first side
Dh2: Blade-height second side
Dih: Tube-height direction
Dih1: Tube-height sealing side
Dih2: Tube-height opening side

The invention claimed is:

1. A stator vane provided in a gas turbine, comprising:
a blade body having a blade shape in a cross-section and extending in a blade-height direction having a direction component perpendicular to the cross section;
a first insert and a second insert which have a tubular shape, extend in a tube-height direction, and are disposed inside the blade body so that the tube-height direction faces the blade-height direction; and
an end cover,
wherein the blade body includes a plurality of blade air passages extending in the blade-height direction inside the blade body,
in the plurality of blade air passages, both a first blade air passage and a second blade air passage have an open end on a blade-height one side which is one side of a blade-height first side and a blade-height second side in the blade-height direction,
both the first insert and the second insert include
an outer peripheral plate portion having a tubular shape and extending in the tube-height direction, and
a sealing plate portion that closes an end on a tube-height sealing side which is one side of the outer peripheral plate portion in the tube-height direction out of two sides in the tube-height direction,
the outer peripheral plate portion has a plurality of impingement holes penetrating from an inside to an outside of the tubular outer peripheral plate portion,
a tube-height opening side which is the other side of the outer peripheral plate portion in the tube-height direction is open,
the outer peripheral plate portion of the first insert has a gap existing between the outer peripheral plate portion of the first insert and a first passage defining surface of the blade body defining the first blade air passage, and is disposed inside the first blade air passage so that cooling air flows into the outer peripheral plate portion from an opening of the first insert,
the outer peripheral plate portion of the second insert is configured so that the tube-height opening side of the second insert faces the blade-height one side, has a gap existing between the outer peripheral plate portion of the second insert and a second passage defining surface of the blade body defining the second blade air passage, and is disposed inside the second blade air passage so that the cooling air flows from an opening of the second insert,
the end cover is provided on the blade-height one side of the blade body so that the cooling air ejected from the plurality of impingement holes of the first insert to between the outer peripheral plate portion of the first insert and the first passage defining surface is guided into the second insert from the opening of the second insert through the opening of the first blade air passage, and covers the opening of the first blade air passage and the opening of the second insert,
in the first blade air passage, an end on the blade-height first side and an end on the blade-height second side of the first blade air passage are open,
in the second blade air passage, an end on the blade-height first side of the second blade air passage is closed, and an end on the blade-height second side is open,
the first insert includes a flange portion spreading from an end on the tube-height opening side in the outer peripheral plate portion of the first insert toward an outer peripheral side of the outer peripheral plate portion of the first insert, extending to the first passage defining surface, and connected to the blade body,
the second insert includes a flange portion spreading from an end on the tube-height opening side in the outer peripheral plate portion of the second insert toward an outer peripheral side of the outer peripheral plate portion of the second insert, extending to the second passage defining surface, and connected to the blade body,
the outer peripheral plate portion of the first insert is disposed inside the first blade air passage so that the tube-height opening side of the first insert faces the blade-height first side, and
the outer peripheral plate portion of the second insert is disposed inside the second blade air passage so that the tube-height opening side of the second insert faces the blade-height second side.

2. The stator vane according to claim 1,
wherein a blade surface which is an outer surface of the blade body includes
a first blade surface portion having a back-to-back positional relationship with the first passage defining surface, and
a second blade surface portion having a back-to-back positional relationship with the second passage defining surface,
the plurality of impingement holes are formed in a portion facing the first blade surface portion in the outer peripheral plate portion in the first insert, and
the plurality of impingement holes are formed in a portion facing the second blade surface portion in the outer peripheral plate portion in the second insert.

3. The stator vane according to claim 2,
wherein the blade body has a plurality of ejection holes penetrating from the second passage defining surface to the second blade surface portion, and
a position of the second blade surface portion on the blade surface is a position where a pressure of a portion along the second blade surface portion outside the blade body is lower than a pressure of a portion along the first blade surface portion outside the blade body while the gas turbine is driven.

4. The stator vane according to claim 3,
wherein the blade body includes
a leading edge extending in the blade-height direction,
a trailing edge extending in the blade-height direction, and
a pressure surface and a suction surface which extend in the blade-height direction and connect the leading edge and the trailing edge,
the first blade surface portion is a portion of one blade surface of the pressure surface and the suction surface, and
the second blade surface portion is located closer to a side of the trailing edge than the first blade surface portion is in the one blade surface.

5. The stator vane according to claim 3,
wherein the blade body includes
a leading edge extending in the blade-height direction, a trailing edge extending in the blade-height direction, and a pressure surface and a suction surface which extend in the blade-height direction and connect the leading edge and the trailing edge, the first blade surface portion is a portion of the pressure surface, and the second blade surface portion is a portion of the suction surface.

6. The stator vane according to claim 1, further comprising:

a first guide member that allows displacement of the first insert in the tube-height direction and that regulates displacement of the first insert in a spreading direction of the cross section of the first insert, inside the first blade air passage; and a second guide member that allows displacement of the second insert in the tube-height direction and that regulates displacement of the second insert in a spreading direction of the cross section of the second insert, inside the second blade air passage.

7. The stator vane according to claim 6, wherein the first guide member includes a first groove member having a first groove extending in the tube-height direction, and a first convex member entering an inside of the first groove and being relatively movable in the tube-height direction with respect to the first groove, one member of the first groove member and the first convex member is fixed to the first insert, and the other member is fixed to the first passage defining surface, the second guide member includes a second groove member having a second groove extending in the tube-height direction, and a second convex member entering an inside of the second groove and being relatively movable in the tube-height direction with respect to the second groove, and one member of the second groove member and the second convex member is fixed to the second insert, and the other member is fixed to the second passage defining surface.

8. The stator vane according to claim 1, further comprising:

a first guide member that allows displacement of the first insert in the tube-height direction and that regulates displacement of the first insert in a spreading direction of the cross section of the first insert, inside the first blade air passage; and a second guide member that allows displacement of the second insert in the tube-height direction and that regulates displacement of the second insert in a spreading direction of the cross section of the second insert, inside the second blade air passage, wherein the first guide member includes a first groove member having a first groove extending in the tube-height direction, and a first convex member entering an inside of the first groove and being relatively movable in the tube-height direction with respect to the first groove, one member of the first groove member and the first convex member is fixed to the outer peripheral plate portion of the first insert, and the other member is fixed to the first passage defining surface of the blade body, the second guide member includes a second groove member having a second groove extending in the tube-height direction, and a second convex member entering an inside of the second groove and being relatively movable in the tube-height direction with respect to the second groove, and one member of the second groove member and the second convex member is fixed to the sealing plate portion of the second insert, and the other member is fixed to a portion closed in an end on the blade-height first side in the second blade air passage in the blade body.

9. The stator vane according to claim 1, further comprising:

a first shroud provided in an end on the blade-height first side in the blade body;

a second shroud provided in an end on the blade-height second side in the blade body; and an impingement plate having a plurality of impingement holes, wherein the first shroud includes a shroud body having a gas path surface facing the blade-height second side, and a counter-gas path surface facing a side opposite to the gas path surface, and a peripheral wall provided along a peripheral edge of the shroud body and protruding from the counter-gas path surface to the blade-height first side, and the impingement plate is formed of the shroud body and the peripheral wall, and is fixed to the first shroud so that a cavity inside a concave portion recessed toward the blade-height second side is partitioned into a space on the blade-height first side and a space on the blade-height second side, and the plurality of impingement holes of the impingement plate extend in the blade-height direction.

10. A gas turbine comprising:

the stator vane according to claim 1;

a rotor that rotates around an axis; and a casing that covers an outer peripheral side of the rotor, wherein the stator vane is fixed to an inner peripheral surface of the casing.

* * * * *